(12) United States Patent
Wiklem et al.

(10) Patent No.: US 9,604,132 B1
(45) Date of Patent: Mar. 28, 2017

(54) VIDEO GAMING PLATFORM AND USER INTERFACE

(71) Applicant: CP Studios LLC, Salt Lake City, UT (US)

(72) Inventors: Brian Joseph Wiklem, Salt Lake City, UT (US); Carrie Ann Cowan, Salt Lake City, UT (US)

(73) Assignee: CP Studios LLC, Salt Lake City ( * ) Notice: Subject to any disclaimer, the term of this patent is extended or adjusted under 35 U.S.C. 154(b) by 0 days.

(21) Appl. No.: 13/889,266

(22) Filed: May 7, 2013

Related U.S. Application Data

(60) Provisional application No. 61/643,352, filed on May 7, 2012.

(51) Int. Cl.
    *A63F 13/12*     (2006.01)
    *A63F 13/30*     (2014.01)

(52) U.S. Cl.
    CPC .................................. *A63F 13/12* (2013.01)

(58) Field of Classification Search
    CPC .. A63F 9/24; A63F 13/00; A63F 13/12; A63F 13/33
    USPC .......................................................... 463/31
    See application file for complete search history.

(56) References Cited

U.S. PATENT DOCUMENTS

| 6,386,980 | B1 | 5/2002 | Nishino et al. | |
| 6,478,679 | B1 | 11/2002 | Himoto et al. | |
| 6,699,125 | B2 | 3/2004 | Kirmse et al. | |
| 7,628,688 | B2 | 12/2009 | Hinami | |
| 7,955,175 | B1 | 6/2011 | Holloway et al. | |
| 8,200,020 | B1 | 6/2012 | Geiss et al. | |
| 8,287,341 | B1 * | 10/2012 | Reynolds et al. | 463/9 |
| 2003/0008710 | A1 | 1/2003 | Yamaoka et al. | |
| 2003/0038805 | A1 * | 2/2003 | Wong | A63F 13/12 345/473 |

(Continued)

OTHER PUBLICATIONS

Clash of Clans Strategy Guide—Tapscape www.tapscape.com/clash-of-clans-strategy-guide/, downloaded Apr. 13, 2016 (9 pages).

(Continued)

*Primary Examiner* — Omkar Deodhar
*Assistant Examiner* — Shauna-Kay Hall
(74) *Attorney, Agent, or Firm* — Patent Law Works LLP

(57) ABSTRACT

The present technology is directed to flexible platform architecture for either providing or facilitating video gaming applications. In some implementations, the flexible platform architecture provides a fluid and continuous visual experience for players across different platform types (platform agnostic) that are integrated and engage users at different levels. Each of the players experiences a unique and different visual experience, depending upon the particular gaming platform and/or user interface utilized by a player. The flexible platform architecture has user interfaces that are configured to provide different experiences for different players, including for example, a three-dimensional or a two-dimensional user experience. The platform architecture may facilitate access to video gaming applications via distinct user interfaces, including 1) via social networks or online social networking services, including via wall posts or by enabling users to send and read text-based posts, 3) via mobile devices, and 4) via game consoles.

18 Claims, 33 Drawing Sheets

(56) References Cited

U.S. PATENT DOCUMENTS

| | | | |
|---|---|---|---|
| 2003/0220143 A1* | 11/2003 | Shteyn | A63F 13/12 463/42 |
| 2004/0266529 A1 | 12/2004 | Chatani | |
| 2005/0049022 A1 | 3/2005 | Mullen | |
| 2007/0087797 A1* | 4/2007 | Van Luchene | A63F 13/12 463/1 |
| 2008/0004117 A1* | 1/2008 | Stamper | G07F 17/32 463/42 |
| 2009/0307226 A1 | 12/2009 | Koster et al. | |
| 2010/0062840 A1* | 3/2010 | Herrmann | 463/25 |
| 2010/0160038 A1* | 6/2010 | Youm et al. | 463/29 |
| 2010/0197380 A1 | 8/2010 | Shackleton | |
| 2010/0216553 A1* | 8/2010 | Chudley et al. | 463/42 |
| 2010/0228614 A1 | 9/2010 | Zhang et al. | |
| 2011/0018868 A1* | 1/2011 | Inoue et al. | 345/419 |
| 2011/0034246 A1* | 2/2011 | Amitzur | 463/32 |
| 2011/0201414 A1 | 8/2011 | Barclay et al. | |
| 2011/0320401 A1 | 12/2011 | Mahajan et al. | |
| 2012/0072855 A1 | 3/2012 | Baldwin et al. | |
| 2012/0184363 A1* | 7/2012 | Barclay et al. | 463/25 |
| 2012/0220377 A1* | 8/2012 | Cantor | A63F 13/12 463/42 |
| 2012/0254764 A1 | 10/2012 | Ayloo et al. | |
| 2013/0006709 A1 | 1/2013 | Kosta | |
| 2013/0035164 A1* | 2/2013 | Osvald | A63F 13/12 463/42 |
| 2013/0097517 A1 | 4/2013 | Reiss et al. | |
| 2013/0103447 A1* | 4/2013 | Melander | G06Q 50/01 705/7.15 |
| 2013/0184064 A1* | 7/2013 | Manning et al. | 463/25 |
| 2013/0196732 A1 | 8/2013 | Oochi et al. | |
| 2014/0004951 A1* | 1/2014 | Kern | A63F 13/86 463/42 |
| 2014/0038721 A1 | 2/2014 | Archer et al. | |

OTHER PUBLICATIONS http://forum.supercell.net, downloaded Apr. 13, 2016 (1 page).
Madden NFL Cooperative Multiplayer Impressions: Ready on Three, Teamwork!, retrieved from http://kotaku.com/5567763/madden-nfl-11-cooperative-multiplayer-impressions-ready-on-three-teamwork on Oct. 10, 2016 (5 pages).

* cited by examiner

VIDEO GAMING PLATFORM AND USER INTERFACE

CROSS REFERENCE TO RELATED APPLICATIONS

The present application claims the benefit of priority under 35 U.S.C. §119(e) from U.S. Provisional Application No. 61/643,352 entitled "MULTILAYER FRAMEWORK ARCHITECTURE AND USER INTERFACES FOR VIDEO GAMING APPLICATIONS," filed on May 7, 2012, by Brian Joseph Wiklem, Christopher Robert Masterton, and Carrie Ann Cowan. The entire contents of the provisional application are incorporated by reference herein. The present application also incorporates by reference the contents of utility applications entitled "MULTILAYER SYSTEM FRAMEWORK AND ARCHITECTURE WITH VARIABLE GAMING CAPABILITIES, "PROVIDING SYNCHRONIZED AND INTEGRATED VIDEO GAMING," AND "PROVIDING VIDEO GAMING ACTION VIA COMMUNICATIONS IN A SOCIAL NETWORK," which are concurrently submitted, and claim priority under 35 U.S.C. §119(e) from U.S. Provisional Application No. 61/643,352.

BACKGROUND

The present disclosure relates to video gaming platforms and applications, including those accessed via online or digital services or communities, for example, social networks, or directly via hosted websites, dedicated either wholly or partially for the purpose of implementing video gaming applications. In particular, the present disclosure relates to video gaming platforms and user interfaces associated with the video gaming platforms.

In recent years, video games have become extremely popular. Video games are used not only for entertainment, but also for instructional purposes. Players typically interact with a gaming application through computer or console peripherals such as keyboard, mouse, joysticks, a wide variety of game pads, and funny controllers such as the NES Zapper®. More recently, nontraditional controller technologies such as dance pads, the Wii-mote® or the Kinect®, offering new types of gaming experiences are beginning to emerge. These technologies are capable of enhancing games to incorporate movement, creating a new experience and attracting new audiences.

With the popularity of social networks reaching epic proportions, social games have also become very popular.

With the ongoing trends and growth in video gaming, it may be beneficial to find better platform architectures for gaming applications that continue to enhance the user experience.

SUMMARY

The present disclosure overcomes the deficiencies and limitations of the prior art by providing a technology with a flexible architecture for video gaming applications. In some embodiments, the flexible architecture provides a continuous visual experience for players across different platforms (platform agnostic) and engages them at different levels. Each of the players may have a unique and different visual experience, depending upon the gaming platform a player uses. The architecture facilitates access to video gaming applications in various ways, including 1) via social networks or sites, for example, accessed via personal computers or laptops; 2) via wall posts or via an online social networking service that enables its users to send and read text-based posts; 3) via mobile devices (iOS®, Android™, or Windows-based smart phones); and 4) via game consoles (for example, PS3®, Xbox 360®, or Wii®).

Video gaming applications may be purchased via platform application stores. These applications are supported by Android (Android is a Linux-based operating system for mobile devices such as smartphones and tablet computers—it is developed by the Open Handset Alliance), iOS (a mobile operating system developed by Apple Inc.) platforms, and phones operating windows. The user interface of an iOS platform is based on the concept of direct manipulation, using multi-touch gestures. Interface control elements consist of sliders, switches, and buttons. The response to user input is immediate and provides a fluid interface.

Video gaming applications may be hosted or accessed via social networks, other third-party services or on third-party servers, stand-alone platforms, tablets, smartphones or the like. Multiple players (hundreds, thousands, if not millions) may access gaming applications via any or all of these ways. In addition, the flexible architecture provides a scalable infrastructure with cross-platform pollination technology (achievements and rewards are transferred between platforms used by particular players) and secure collection of data. Video gaming applications may be based on universal themes that appeal to a broad range of demographics and provides a continuous flow of data analytics. They offer opportunities for configuring advertisements and promotions to accomplish strategic goals.

In some embodiments, the flexible architecture provides multiple levels of play, permitting players to engage in different ways. The different levels of play options include 1) a peer-to-peer competitive challenge level for core players, 2) a casual play option for play with friends with whom a player shares an affinity, for example, in a social network; and a 3) spectator mode that permits non-players in a network to assist friends. Feed-based triggers allow for greater rewards to players and ease of discovering games.

In yet other embodiments, which may include any or all of the aspects described above, the flexible architecture permits mobile play, extending the gaming arena or world to different platforms, so achievements in a particular game may be earned and shared more easily across platforms. In addition, a player may earn location-based rewards.

Moreover, the flexible architecture provides a system of rewards at check-in, to coax players by providing greater incentives. The flexible architecture permits concurrent "solo" play by a player or gamer, collaborative and competitive play by multiple players. The flexible architecture has user interfaces that are configured to provide different experiences for different players, including for example, a three-dimensional user experience. In some embodiments, the video gaming applications include story-driven quests and game play, giving players more than just tasks and chores. As one example, an aviation gaming application may utilize a collection of two hundred and fifty or more aircrafts and include transactions relating to the aircrafts and their environment, creation of the environment in which the aircrafts operate, etc. In this particular application, players may create and manage their experience (for example, build and manage an aviation empire), enjoy the thrill of history (aviation's past), and travel the globe and fly through an open network of friendly and rival airports.

In yet other embodiments, the system provides a plurality of features for player control of the virtual arena including control of "play" times, "gifts" and "rewards," "collect" and "decorate" features, monitor types of "play" (for example, acceleration progress), generate user content, etc.

In some embodiments, the video gaming applications may be free, when accessed via social-network platforms, in which instances revenue is generated via market place for products used during the game, direct advertising, etc. The flexible architecture permits for easy access through a particular player's social network, allowing other players to discover a particular game and permit conversion as necessary.

In yet other embodiments, linking or connecting platforms creates a more interesting gaming world.

BRIEF DESCRIPTION OF THE DRAWINGS

The present disclosure is illustrated by way of example, and not by way of limitation, in the figures of the accompanying drawings, in which like reference numerals are used to refer to similar elements.

DETAILED DESCRIPTION

Figure 1:
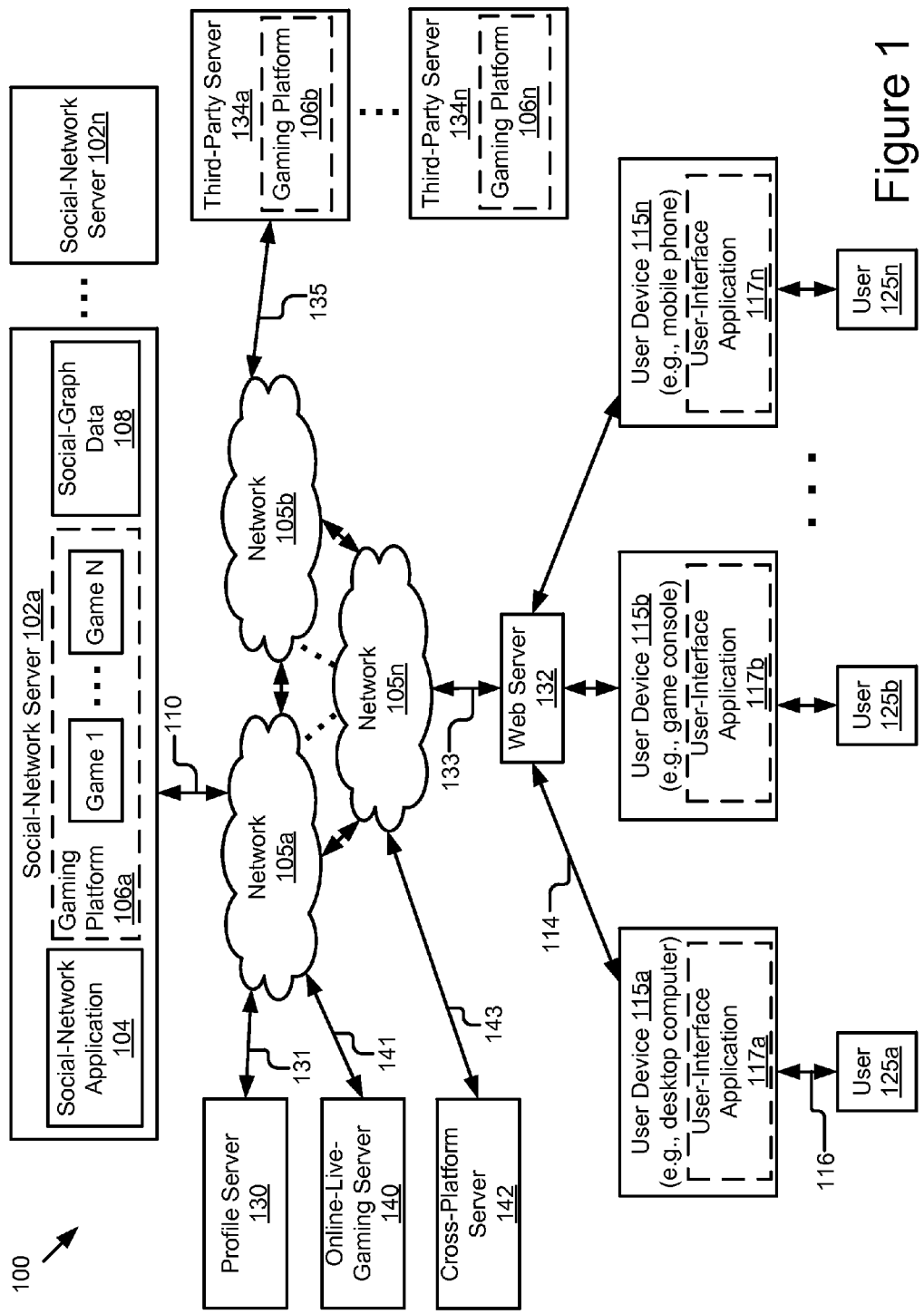
FIG. 1 is a high-level block diagram illustrating some embodiments of a system for providing a video gaming platform, accessed either via a social network (hosted on a social network server or a server associated with it), an online or digital live gaming server, or a third-party video gaming website (hosted by a third party on its server).

The present technology is directed to a video gaming platform and user interface for video gaming applications with variable video gaming capabilities, for play by users (players or gamers), either via social networks, or on third party servers. The specification describes examples of the video gaming platform and user interfaces that facilitate a unique user experience and methods involved in the platform and user interface and for operating them to facilitate play by remotely located players or gamers. These video gaming applications referenced or described here may either be hosted by an online community, for example, one or more social networks, or alternatively, by third party servers that are wholly or partially dedicated to gaming applications.

In some embodiments, the flexible architecture provides a continuous visual experience for players across different platforms (platform agnostic) and engages them at different levels. Each of the players may have a unique and different visual experience, depending upon the gaming platform a player uses. This flexible architecture facilitates access to video gaming applications in various ways, including 1) via social networks or sites, for example, accessed via personal computers (desktops or laptops); 2) via wall posts or via an online social networking service that enables its users to send and read text-based posts; 3) via mobile devices (iOS, Android, or Windows-based smart phones); and 4) via game consoles (for example, PS3, Xbox 360, or Wii).

Video gaming applications may be purchased via platform application stores. These applications are supported by Android (Android is a Linux-based operating system for mobile devices such as smartphones and tablet computers— it is developed by the Open Handset Alliance), iOS (a mobile operating system developed by Apple Inc.) platforms, and phone operating windows. The user interface of iOS is based on the concept of direct manipulation, using multi-touch gestures. Interface control elements consist of sliders, switches, and buttons. The response to user input is immediate and provides a fluid interface.

Video gaming applications may be hosted or accessed via social networks, other third party services or on third party servers, stand-alone platforms, tablets, smartphones, or the like. Multiple players (hundreds, thousands, if not millions) may access gaming one or more applications via any or all of these ways. In addition, the flexible architecture provides a scalable infrastructure with cross-platform pollination technology (achievements and rewards are transferred between platforms for particular players) and secure data collection. Video gaming applications may be based on universal themes that appeal to a broad range of demographics and provides a continuous flow of data analytics. They offer opportunities for configuring advertisements and promotions to accomplish strategic goals.

In yet other embodiments, which may include any or all of the aspects described above, the architecture permits mobile play, extending the gaming arena or world to different platforms, so achievements in a particular game may be earned and shared more easily across platforms. In addition, a player may earn location-based rewards.

Moreover, the system provides rewards at check-in, to coax players by providing greater incentives. The architecture permits for concurrent "solo" play by a player or gamer and collaborative and competitive play between multiple players. User interfaces are configured to provide different experiences for different players, including a three-dimensional user experience. In some embodiments, the video gaming applications include story-driven quests and game play, giving players more than just tasks and chores. By way of example, an aviation gaming application, may utilize a collection of 250 aircrafts and include transactions relating to the aircrafts and its environment, permitting players to create an environment in which the aircrafts operate, etc. In this particular application, players may create and manage their experience (for example, by creating an aviation empire), enjoy the thrill of history (aviation's past), and travel the globe and fly through an open network of friendly and rival airports.

The system provides features for player control of the virtual arena including control of "play" times, "gifts" and "rewards," "collect" and "decorate," monitor "play" (for example, acceleration progress), generate user content, etc.

The video gaming applications may be free, when accessed via social-network platforms, in which instances revenue is generated via market place for products used during the game, direct advertising, etc. The flexible architecture permits for easy access through a particular player's social network, allowing other players to discover a particular game and permit conversion as necessary. Linking or connecting platforms creates a more interesting and viable gaming world.

The architecture accords variable status to players who can opt for different levels of play. A "core" game play status enables players to be leaders and play the entire game. A leader has control of all aspects of a particular gaming application. A "casual" or "follower" game play status enables players to play from a different perspective, providing access to only a portion of the entire game. A "spectator" or "bystander" game play enables players to play from a reactive perspective. Players are accorded this status when they initiate play via a social network wall posting, a response to a social networking service facilitating exchange of text or via any other key word response, which has direct impact on game play. Players with this status can request permission to visit game play arenas of other players. This request may be in response to advertising or promotion displays.

Players (with any status described above) may access game play via mobile devices, at any location, and receive location-based rewards. They may access a virtual game arena, their own or that of other players, via several platforms and take up play where they left off. They may link up friends for collaborative play. Players may also participate in standalone game play, via tablets, mobile devices, console-based game play, target-based game play or the like. In addition, the system permits cross-pollination game play, sending game objects from one game world or arena to another.

In the following description, for purposes of explanation, numerous specific details are indicated in order to provide a thorough understanding of the technology described. This technology may be practiced without these specific details. In the instances illustrated, structures and devices are shown in block diagram form in order to avoid obscuring the technology. For example, the present technology is described with some implementations illustrated below with reference to user interfaces and particular hardware. However, the present technology applies to any type of computing device that can receive data and commands, and any devices providing services. Moreover, the present technology is described below primarily in the context of providing video game architecture; however, the present technology applies to any type of situation and may be used for other applications beyond video games. In particular, this technology may be used in other contexts besides video games.

Reference in the specification to "one embodiment," "an embodiment," or "some embodiments" means simply that one or more particular features, structures, or characteristics described in connection with the one or more embodiments is included in at least one or more embodiments that are described. The appearances of the phrase "in one embodiment or instance" in various places in the specification are not necessarily all referring to the same embodiment or instance.

Some portions of the detailed descriptions that follow are presented in terms of algorithms and symbolic representations of operations on data bits within a computer memory of either one or more computing devices. These algorithmic descriptions and representations are the means used to most effectively convey the substance of the technology. An algorithm as indicated here, and generally, is conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the following discussion, it should be appreciated that throughout the description, discussions utilizing terms, for example, "processing," "computing," "calculating," "determining," or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present technology also relates to an apparatus for performing the operations described here. This apparatus may be specially constructed for the required purposes, or it may include a general-purpose computer selectively activated or reconfigured by a computer program stored in the computer. For example, a computer program may be stored in a computer-readable storage medium, for example, but not limited to, any type of disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

This technology may take the form of an entirely hardware implementation, an entirely software implementation, or an implementation including both hardware and software components. In some instances, this technology is implemented in software, which includes but is not limited to firmware, resident software, microcode, etc.

Furthermore, this technology may take the form of a computer program product accessible from a computer-usable or computer-readable medium providing program code for use by or in connection with a computer or any instruction execution system. For the purposes of this description, a computer-usable or computer-readable medium may be any apparatus that can include, store, communicate, propagate, or transport the program for use by or in connection with the instruction execution system, apparatus, or device.

A data processing system suitable for storing and/or executing program code includes at least one processor coupled directly or indirectly to memory elements through a system bus. The memory elements may include local memory employed during actual execution of the program code, bulk storage, and cache memories, which provide temporary storage of at least some program code in order to reduce the number of times code may be retrieved from bulk storage during execution.

Input/output or I/O devices (including but not limited to keyboards, displays, pointing devices, etc.) may be coupled to the system either directly or through intervening I/O controllers.

Communication units including network adapters may also be coupled to the systems to enable them to couple to other data processing systems, remote printers, or storage devices, through either intervening private or public networks. Modems, cable modems, and Ethernet cards are just a few examples of the currently available types of network adapters.

Finally, the algorithms and displays presented in this application are not inherently related to any particular computer or other apparatus. Various general-purpose systems may be used with programs in accordance with the teachings here, or it may prove convenient to construct more specialized apparatus to perform the required method steps. The required structure for a variety of these systems is outlined in the description below. In addition, the present technology is not described with reference to any particular programming language. It should be understood that a variety of programming languages may be used to implement the technology as described here.

Example Architecture Overview

FIG. 1 is a high-level block diagram illustrating some embodiments of systems for providing gaming applications, either via social networks, an online live gaming server, or on third party servers. The system 100 illustrated in FIG. 1 provides gaming platforms 106*a* or 106*b* so that participants (players or gamers) may access one or more gaming applications, initiate a play on one device or gaming platform and continue play at another device or gaming platform, making transitions between devices or platforms essentially seamless and enabling a continuous playing experience.

The system 100 includes one or more social network servers 102*a* through 102*n* that may be accessed via user devices 115*a*, 115*b* through 115*n*, which are used by users 125*a*, 125*b*, through 125*n*, to connect to any one of the social network servers 102*a* through 102*n*. The user devices 115*a* through 115*n* may be a desktop computer, a game system or a mobile phone. These entities (user devices 115a-115n and social network servers 102a-102n) are communicatively coupled via one or more networks 105a, 105b, and 105n. Although only three user devices or platforms 115a, 115b through 115n are illustrated, any numbers of user devices or platforms 115n may be used by any number of users (players, gamers, or the like) 125n. Moreover, those skilled in the art should recognize that while the present disclosure is described below primarily in the context of providing gaming applications, the present disclosure may be applicable to other types of applications, for entertainment or otherwise. As some examples, gaming applications may include operations for creating plays, participating in plays, etc.

The user devices 115a through 115n in FIG. 1 are illustrated by way of example. Although FIG. 1 illustrates only three devices, the present disclosure applies to any system architecture having one or more user devices 115a through 115n (with user-interface applications 117a through 117n), therefore, any number of user devices 115n (hundreds, thousands, even millions or more) may be used.

Furthermore, while only three networks 105a, 105b, and 105n are illustrated as coupled to the user devices 115a, 115b through 115n, the social network servers 102a-102n, the profile server 130, the web server 132, the online live gaming server 140, the cross-platform server 142, and one or more third party servers 134a through 134n, in practice, any number of networks 105n may be connected, either directly or indirectly, to these entities. In addition, although only two third party servers 134a through 134n are shown, the system architecture 100 may include one or more third party servers 134n, each with a gaming platform 106b through 106n, operating one or more gaming applications that are similar or different.

In some embodiments, the social network server 102a is coupled to the network 105a, via a signal line 110. The social network server 102a includes a social network application 104, which comprises the software routines and instructions to operate the social network server 102a and its functions and operations. Although only one social network server 102a is described here, persons of ordinary skill in the art should recognize that multiple servers may be present, as illustrated by social network servers 102n, each with functionality similar to social network server 102a or different.

The term "social network" as used here encompasses its plain and ordinary meaning including, but not limited to, any type of social structure where the users are connected by a common feature or link. The common feature includes relationships/connections, e.g., friendship, family, work, a similar interest, etc. The common features are provided by one or more social networking systems, such as those included in the system architecture 100, including explicitly-defined relationships and relationships implied by social connections with other online users, where the relationships form a social graph 108.

The term "social graph" as used here encompasses its plain and ordinary meaning including, but not limited to, a set of online relationships between users (players and non-players), such as provided by one or more social networking systems, operating on social network servers 102a through 102n, including explicitly-defined relationships and relationships implied by social connections with other online users, where the relationships form a social graph. In some examples, the social graph 108 may reflect a mapping of these users and how they are related.

It should be understood that social network server 102a and the social network software/application 104 are representative of a single social network. Each of the plurality of social networks 102a through 102n is coupled to any one of the networks 105a, 105b, and 105n, each having its own server, application, and social graph. For example, a first social network system operated or hosted on a social network server may be directed to business networking, a second directed to or centered on academics, a third directed to local business, a fourth directed to dating or gaming, and yet others directed to other general interests or perhaps a specific focus. Yet, each may provide access to a gaming platform 106a for operating or providing access to video gaming applications.

A profile server 130 is illustrated as a stand-alone server in FIG. 1. In other embodiments of the system architecture 100, all or part of the profile server 130 may be part of the social network server 102a. The profile server 130 is directly connected to the network 105a, via a line 131. The profile server 130 stores profiles for all the users that belong to a social network. A third party server 134a is connected to the network 105b, via a signal line 135. A web server 132 is connected, via a line 133, to the network 105n. The web server 132 delivers access to content, via the internet, for example, by hosted websites or the like. Users may use the web browsers on their electronic devices or gaming platforms to browse for gaming applications and access websites hosting gaming applications.

An online live gaming server 140 is an online multiplayer gaming and digital media delivery service connected to the network 105a through 105n via signal line 141 for providing users (i.e., players) with online gaming capabilities. This allows users to interact (e.g., play games) with multiple players (hundreds, thousands, if not millions) via the online live gaming server 140 (e.g., Xbox Live, Playstation Network, etc.).

A cross-platform server 142 is an online server connected to the network 105a through 105n via signal line 143 that receives information from one or more clients (e.g., mobile device, social network, gaming server, etc.) and translates the data such that it becomes usable by the gaming platform 106a through 106n. The cross-platform server 142 also translates information from the gaming platform 106a through 106n such that it becomes usable by the one or more clients (e.g., mobile device, social network, gaming server, etc.).

The user devices or player gaming platforms 115a through 115n can be a computing device, for example, a laptop computer, a desktop computer, a tablet computer, a mobile telephone (iOS, Android, or windows-based phone, a personal digital assistant (PDA), a mobile email device, a portable game player, a game console (PS3, Xbox 360, Wii or the like) a portable music player, a television with one or more processors embedded in the television or coupled to it, or any other electronic device capable of accessing a network and participating in a gaming application.

The network 105a, 105b, or 105n, is of conventional type, wired or wireless, and may have any number of configurations, such as a star configuration, token ring configuration, or other configurations known to those skilled in the art. Furthermore, the network 105 may comprise a local area network (LAN), a wide area network (WAN, e.g., the Internet), and/or any other interconnected data path across which one or more devices may communicate.

In another embodiment, the network 105a, 105b, or 105n may be a peer-to-peer network. The network 105a, 105b, or 105n may also be coupled to or include portions of one or more telecommunications networks for sending data in a variety of different communication protocols.

In yet another embodiment, the network 105*a*, 105*b*, or 105*n*, includes Bluetooth communication networks or a cellular communications network for sending and receiving data such as via short messaging service (SMS), multimedia messaging service (MMS), hypertext transfer protocol (HTTP), direct data connection, WAP, email, etc.

In some embodiments, the social network server 102*a*, the profile server 130, the web server 132, online live gaming server 140, cross-platform server 142, and the third party servers 134*a* through 134*n* are hardware servers including a processor, memory, and network communication capabilities. One or more of the users (players or gamers) 125*a* through 125*n* access any of the social network servers 102*a* through 102*n*, or the third party servers 134*a* through 134*n*, via browsers in their user devices or gaming platforms and via the web server 132. The user devices 115*a* through 115*n* have user interface applications 117*a*, 117*b*, through 117*n*, that manage access by particular players to select gaming applications or their choice.

Figure 2:
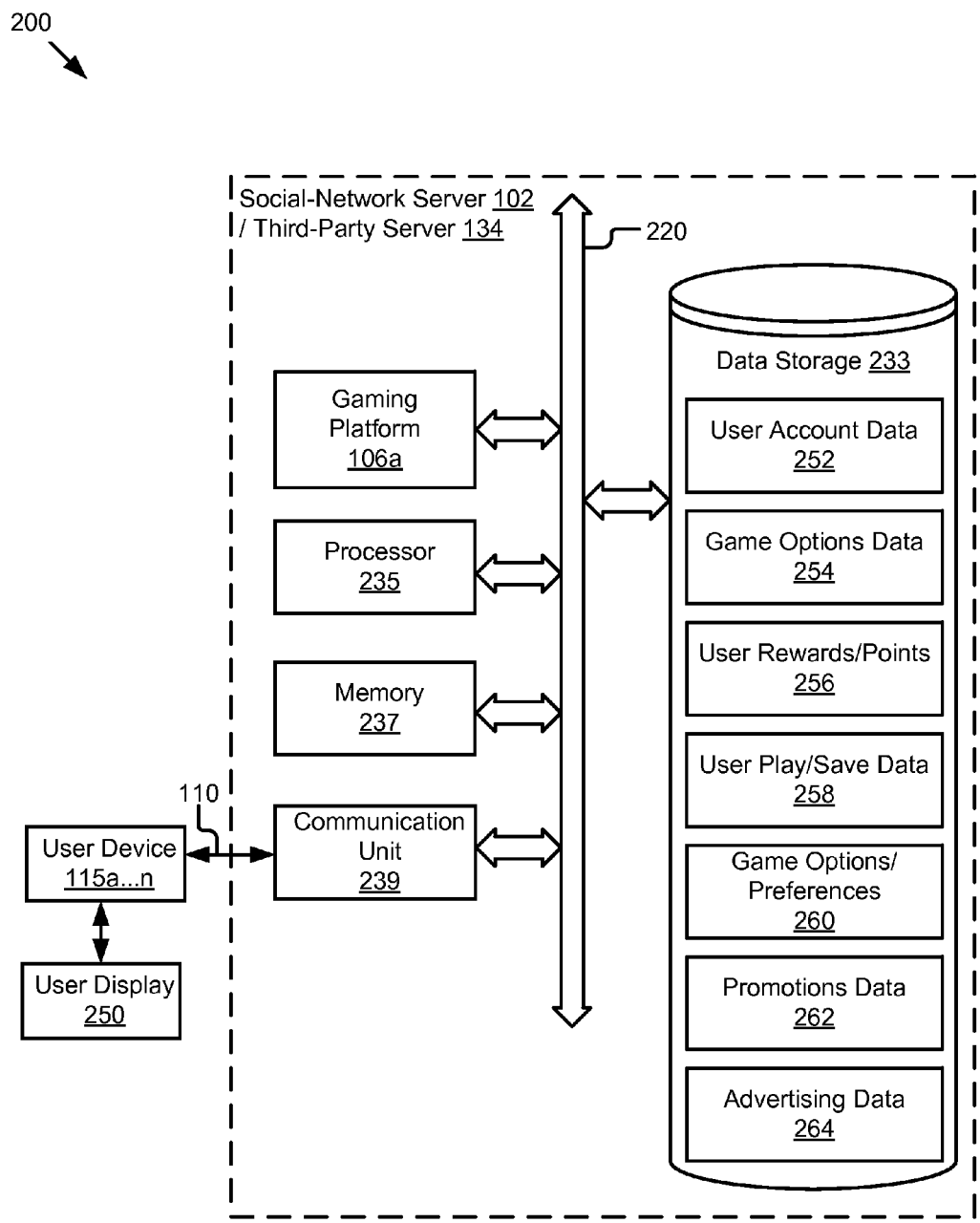
FIG. 2 is a block diagram illustrating some embodiments of a social network server or a third party server shown in FIG. 1, including its hardware components.

FIG. 2 is a block diagram illustrating some embodiments of the social network server 102 (a through n) or third party server 134 (a through n). In FIG. 2, like reference numerals have been used to reference like components with the same or similar functionality that has been described above with reference to FIG. 1. Since those components have been described above that description is not repeated here. The social network server 102*a* generally comprises one or more processors, although only one processor 235 is illustrated in FIG. 2. The processor is coupled via a bus 220 to memory 237 and database storage 233, which stores user account data 252, game options data 254, user rewards/points 256, user play/save data 258, game options/preferences 260, promotion data 262 and advertising data 264.

In some embodiments, the database storage 233 is a database organized by the hosting server and the user. For each user or player, the data storage 233 stores data on the user and user game plays, etc. For example, this data may include related social network activity such as posts, shares, invitations, status changes, etc., associated with each user engaged in a video gaming application.

A user or player 125*a*, via a user or gaming device 115*a*, communicates a request to initiate a gaming application or reacts to a keyword via communication unit 239. The "set up" for a video gaming application is managed by the gaming platform 106*a*. It should be recognized that the gaming platform 106*a* (illustrated in the social network server 102*a*) and 106*b* (illustrated in the third party server 134*a*) are shown separately, but include similar functionality, at least for purposes of operating the gaming applications. A user or player display 25 coupled to the user device 115*a* through *n*, is configured to provide the video source of the gaming application in one of many formats, high definition graphics, three dimensional formats, etc.

Figure 3:
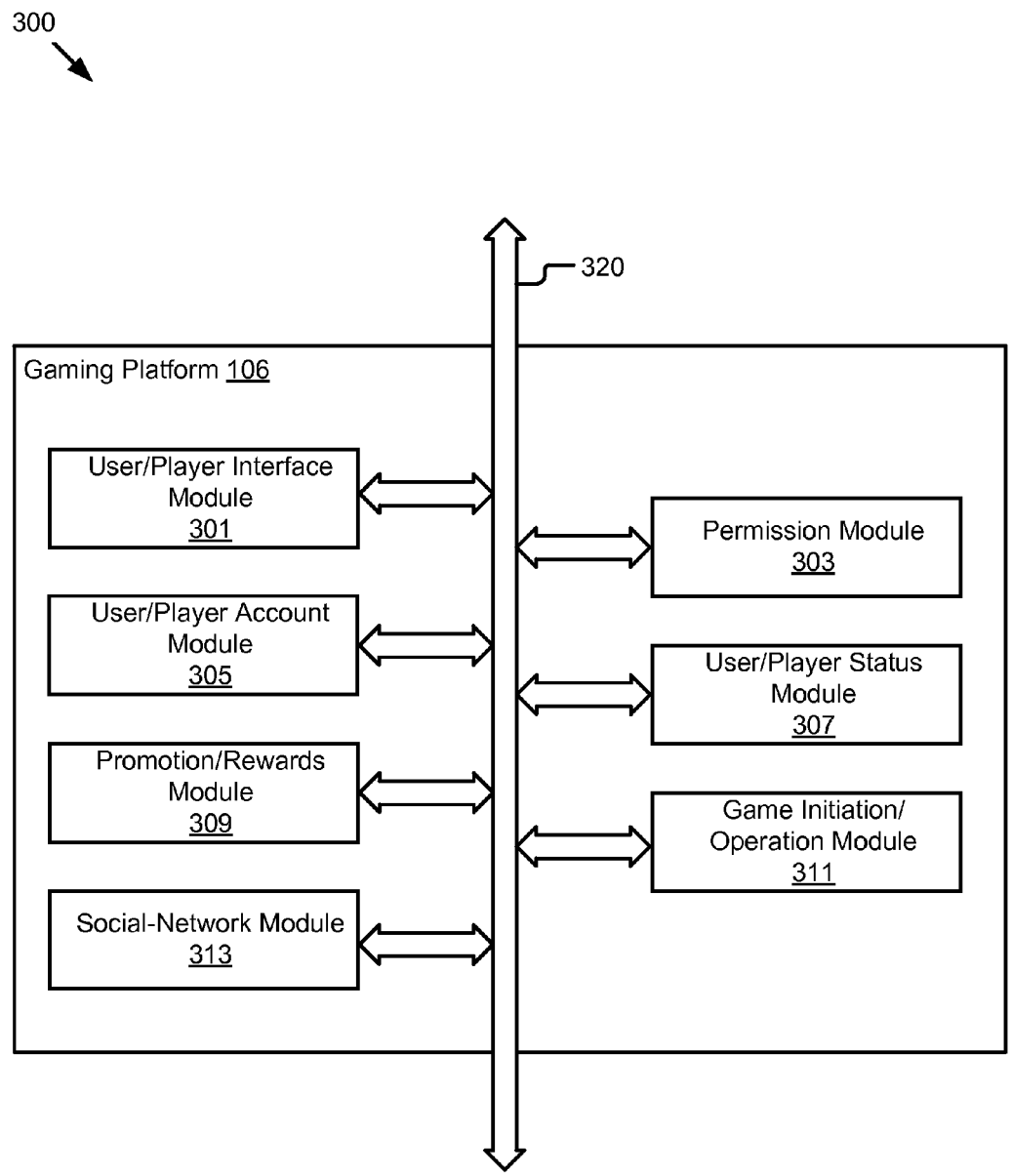
FIG. 3 is a block diagram illustrating some embodiments of a gaming platform shown in FIGS. 1 and 2, and its software components.

Referring now to FIG. 3, like reference numerals have been used to reference like components with the same or similar functionality that has been described above with reference to FIG. 1. Since those components have been described above, that description is not repeated here. The gaming platform 106 (a orb) includes various modules that are programmed to perform the functionalities described here. These modules may be variously distributed or may be in a single unit. The gaming platform 106 includes a user interface module 301, a permissions module 303, a user/player account module 305, a user/player status module 307, a promotion/rewards module 309, a game initiation/operation module 311, and a social network module 313. Each of these modules is coupled to a software communication mechanism 320 to communicate the other modules. Examples of a software communications mechanism 320 may be an object bus (such as COBRA), direct socket communication (such as TCP/IP sockets) among software modules, remote procedure calls, UDP broadcasts and receipts, HTTP connections, function or procedure calls, etc. Further, any or all of the communication could be secure (SSH, HTTPS, etc.). The software communication can be implemented on any underlying hardware, such as a network, the Internet, a bus 220 of FIG. 2, or a combination thereof, etc.

By way of example, a particular user 125*a* communicates via a user device 115*a*, to either initiate or react to a game play. The user interface module 301 facilitates a connection of the user device 115*a* with the social network server 102*a*, in the event the player wishes to engage or participate in a gaming application via the social network server 102*a*. The permission module 303 ensures that the user device is compliant with protocols and any privacy concerns. Once a video gaming application has been set up, the user/player account module 305 makes a note of the user to determine if the user has an existing account or must create one. The user/player status module 307 considers the status of the various users ("leader," "follower," or "spectator"). A promotion/rewards module 309 operates the necessary promotions permitting players to earn rewards accorded by the promotions. The game initiation/operation module 311 initiates play and the social network module 313 tracks the applications engaged by a particular player and updates the player's social profile accordingly.

Example Methods

Figure 4:
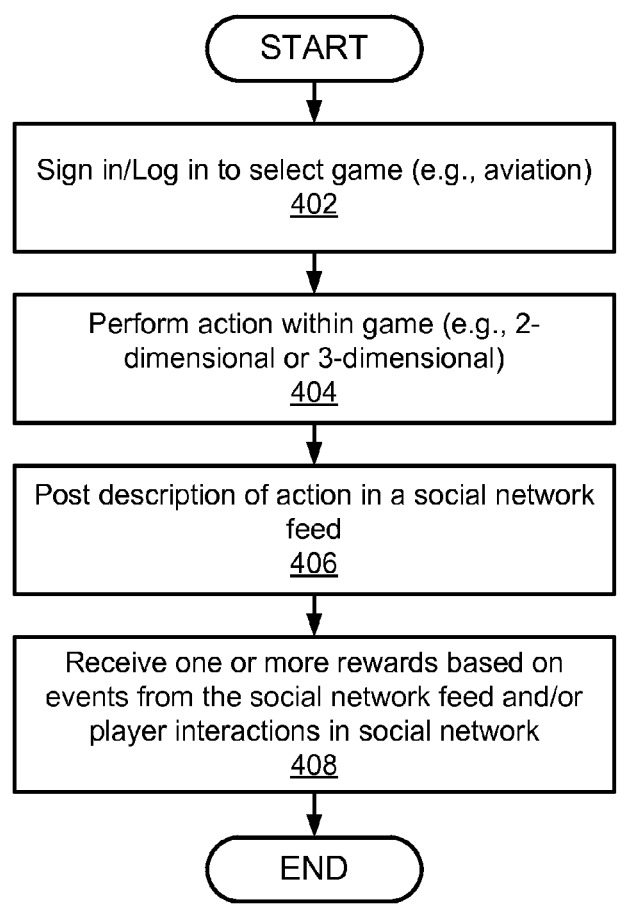
FIG. 4 is a flow chart illustrating an example method for game play, in this instance an aviation game.

FIG. 4 illustrates an example method for aviation game play. It should be understood that the order of the operations in FIG. 4 is merely by way of example and may be performed in different orders than those that are illustrated and some operations may be excluded, and different combinations of the operations may be performed. In the example method illustrated, one or more operations may include signing in/logging in to a select game (for example, an aviation game), as illustrated by block 402. The method 400 then proceeds to the next block 404 and may include one or more operations to perform an action within the game (for example, displayed as a two-dimensional or three-dimensional display). The method 400 then proceeds to the next block 406 and may include one or more operations to post a description of the action in a social network feed. The method 400 then proceeds to the next block 408 and may include one or more operations to receive one or more rewards based on events from the social network feed and/or player interactions.

Figure 5:
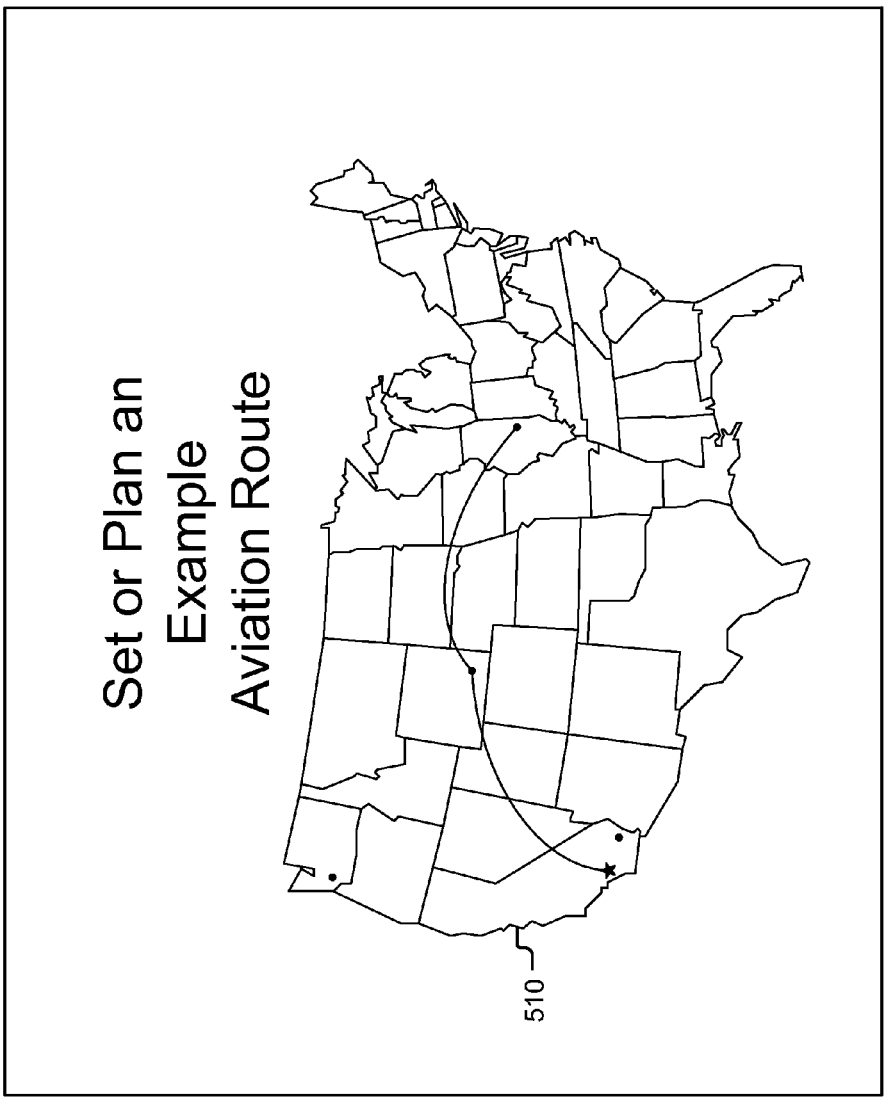
FIG. 5 is a graphical representation of an example action via a user interface, by a user in a gaming application (e.g. aviation), for example, where a user creates or sets an aviation route.
Figure 6:
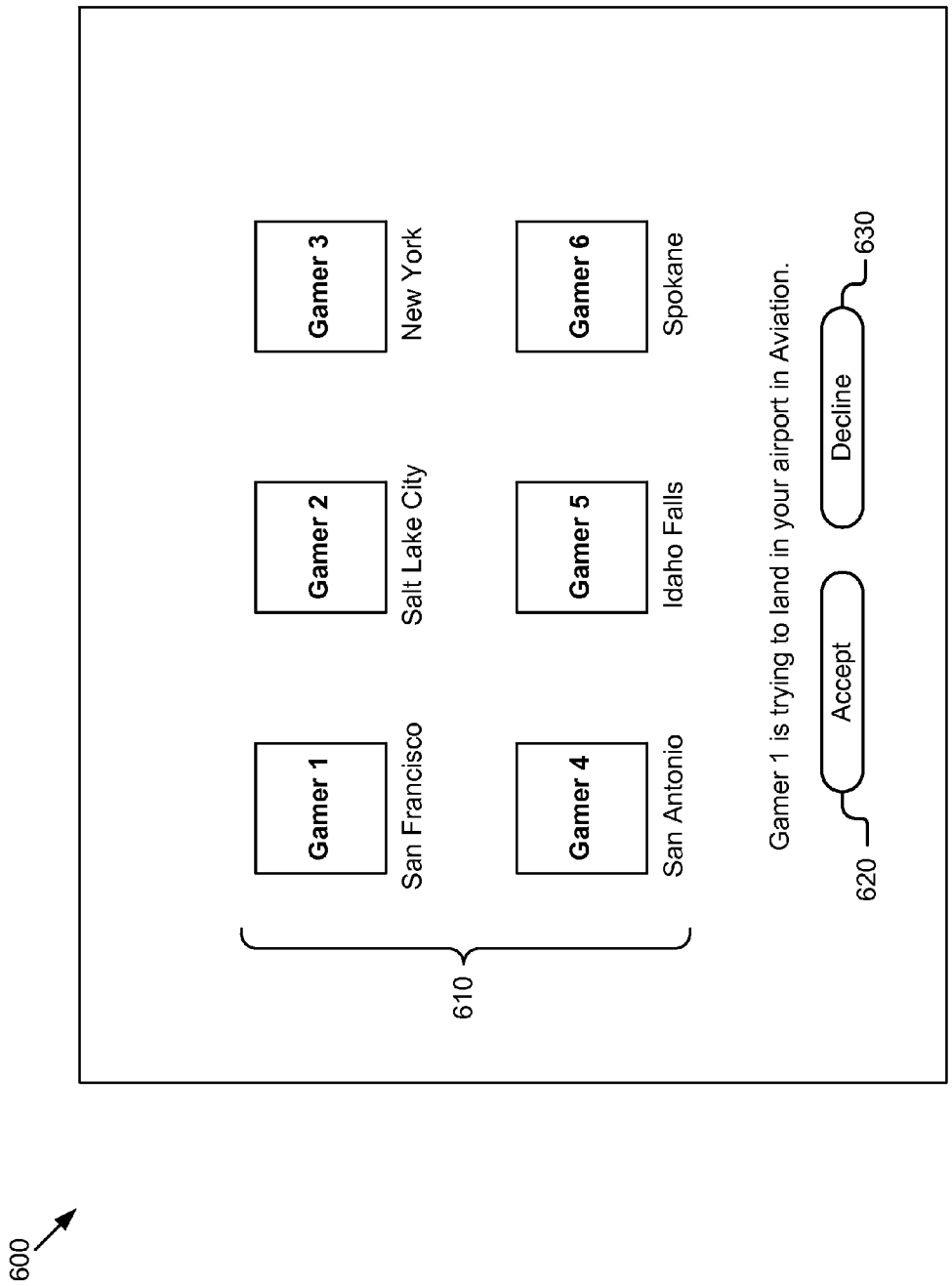
FIG. 6 is a graphical representation illustrating a gaming applications operating on a third-party server, with concurrent play by users (gamers or players) from remote locations linked by an integrated user interface.

FIG. 5 illustrates an example of a graphical representation of a flight route that may be created in this gaming application (aviation game). Multiple players (Gamers 1 through 6) may engage in this game, as illustrated by reference numeral 1610 in FIG. 6. Each of these gamers may be at remote locations and may access this game operated on a third party server. An action by gamer 1 impacting another gamer is indicated to any of the other gamers impacted, requiring acceptance or denial by the gamer impacted. The impacted gamer may "accept" the action, indicated by reference numeral 620 or may "decline" the action, indicated by reference numeral 630.

Figure 7:
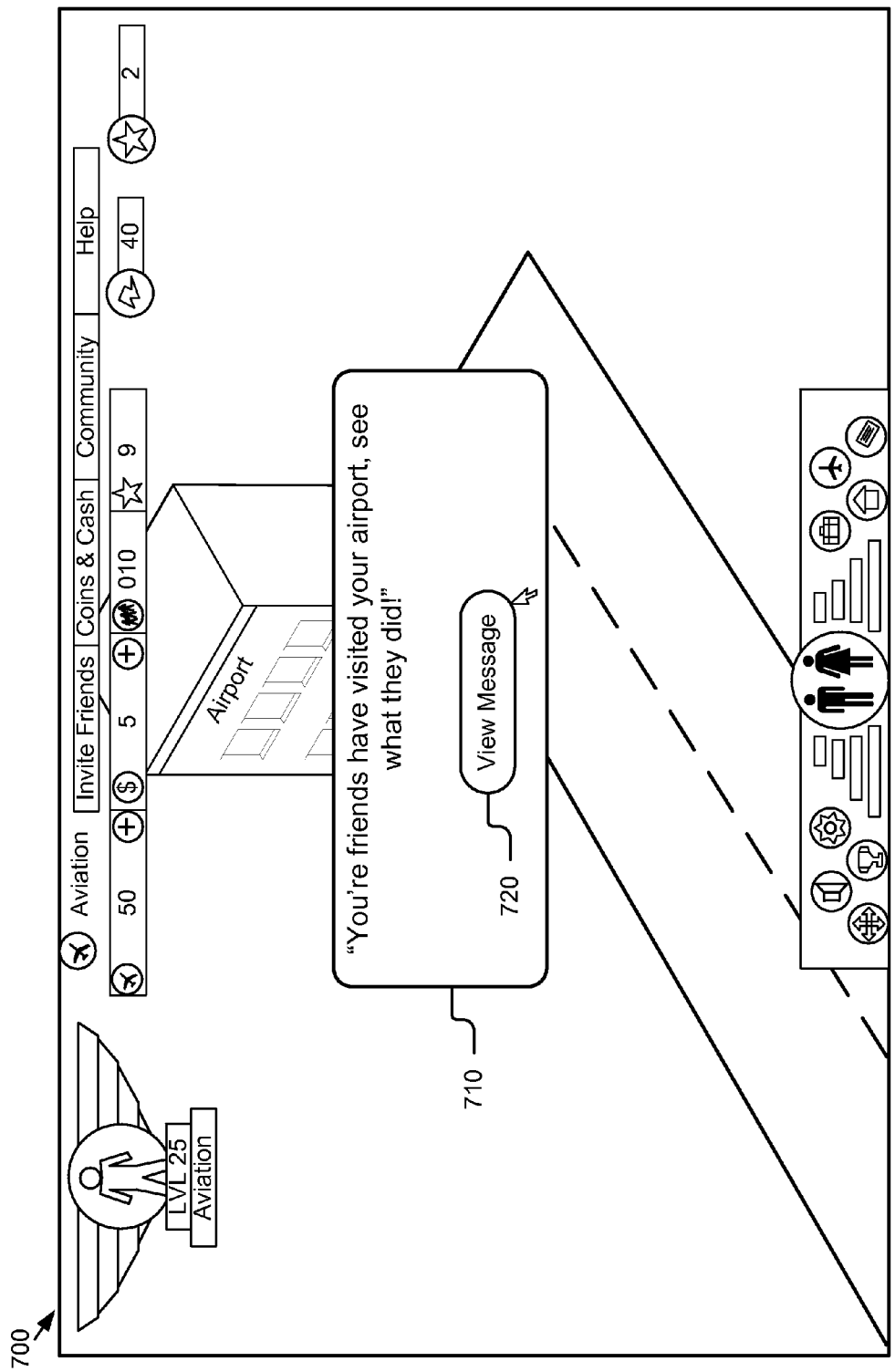
FIG. 7 is a graphical representation illustrating an example user interface display to one player with an in-game message related to another player's activity.

As one example of a select game, an aviation video gaming application is described here in FIG. 7 through FIG. 23. FIG. 7 illustrates some embodiments of a user interface 700 for displaying an in-game message related to another player's activity. A player may receive an in-game notification (indicated by reference numeral 710) describing certain activities relating to the player. For example the in-game notification (indicated by reference numeral 710) states that friends have visited the player's airport and allows the player to view the description (by pressing the button 720) of what the friends' did while at the player's airport.

Figure 8:
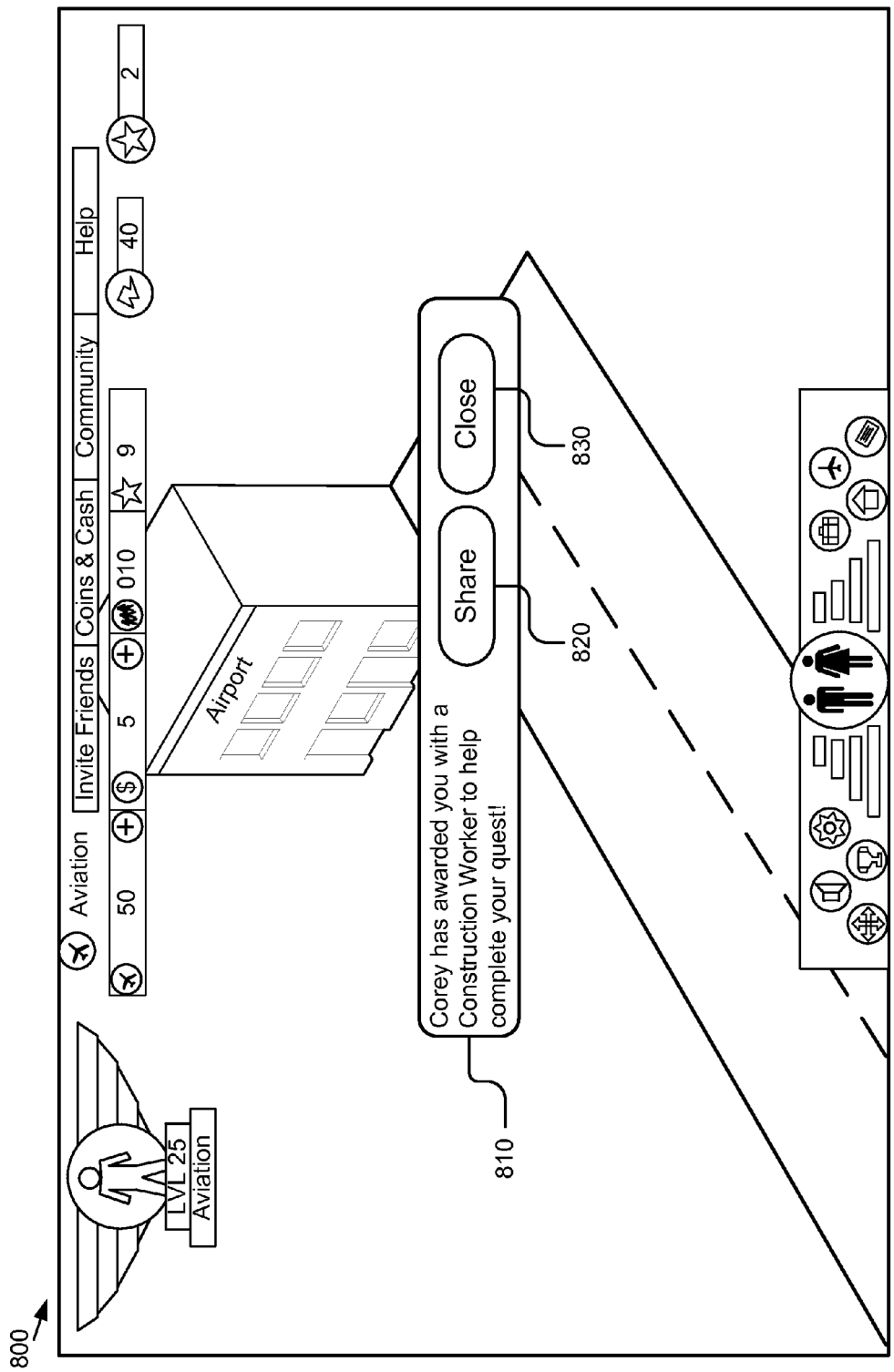
FIG. 8 is a graphical representation illustrating an example user interface display to one player with an in-game message awarding items from another player.

FIG. 8 illustrates some embodiments of a user interface 800 for displaying an in-game message related to awarding items. A player may receive an in-game notification (indicated by reference numeral 810) describing an in-game item that was given to the player by a friend to assist the player in completing a quest (i.e., challenge). The in-game notification (indicated by reference numeral 810) may also allow the user (via the share button 820) to share this information and/or the in-game item with one or more additional players. The in-game notification (indicated by reference numeral 810) may also allow the user (via the close button 820) to hide the in-game notification.

Figure 9:
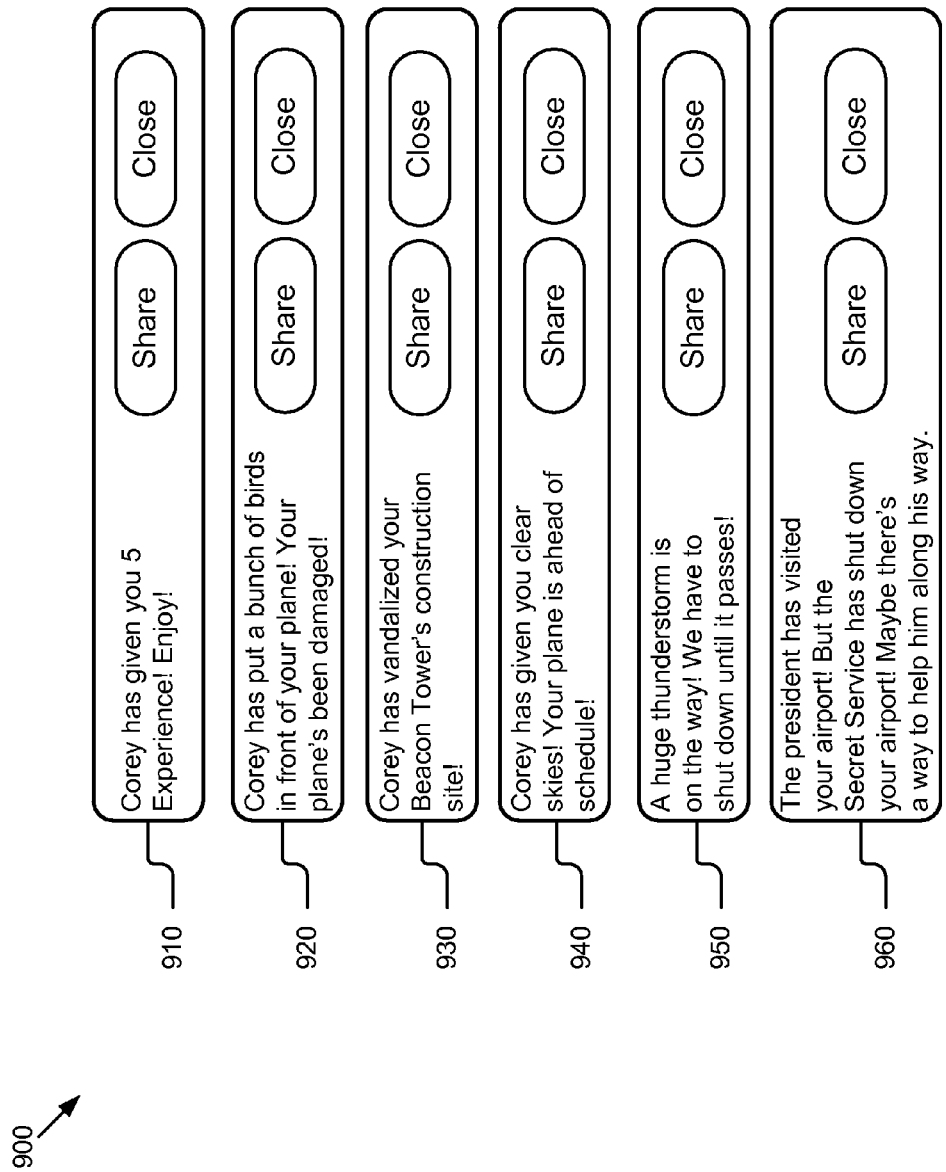
FIG. 9 is a graphical representation illustrating several example in-game messages displayed to one player on another player's activity.

FIG. 9 illustrates some embodiments 900 of example in-game messages related to another player's activity. For example, a player may give experience points to another player, as indicated by the in game notification 910. A player may sabotage another player's flight by damaging the airplane, as indicated by the in game notification 920. A player may sabotage another player's airport by damaging a construction site, as indicated by the in game notification 930. A player may improve another player's travel time by giving them clear skies, as indicated by the in game notification 940. A player may have their airport shut down due to in-game weather conditions, as indicated by the in game notification 950. A player may have their airport shut down due to a particular event, for example, the president visiting a player's airport, as indicated by the in game notification 960.

Figure 10:
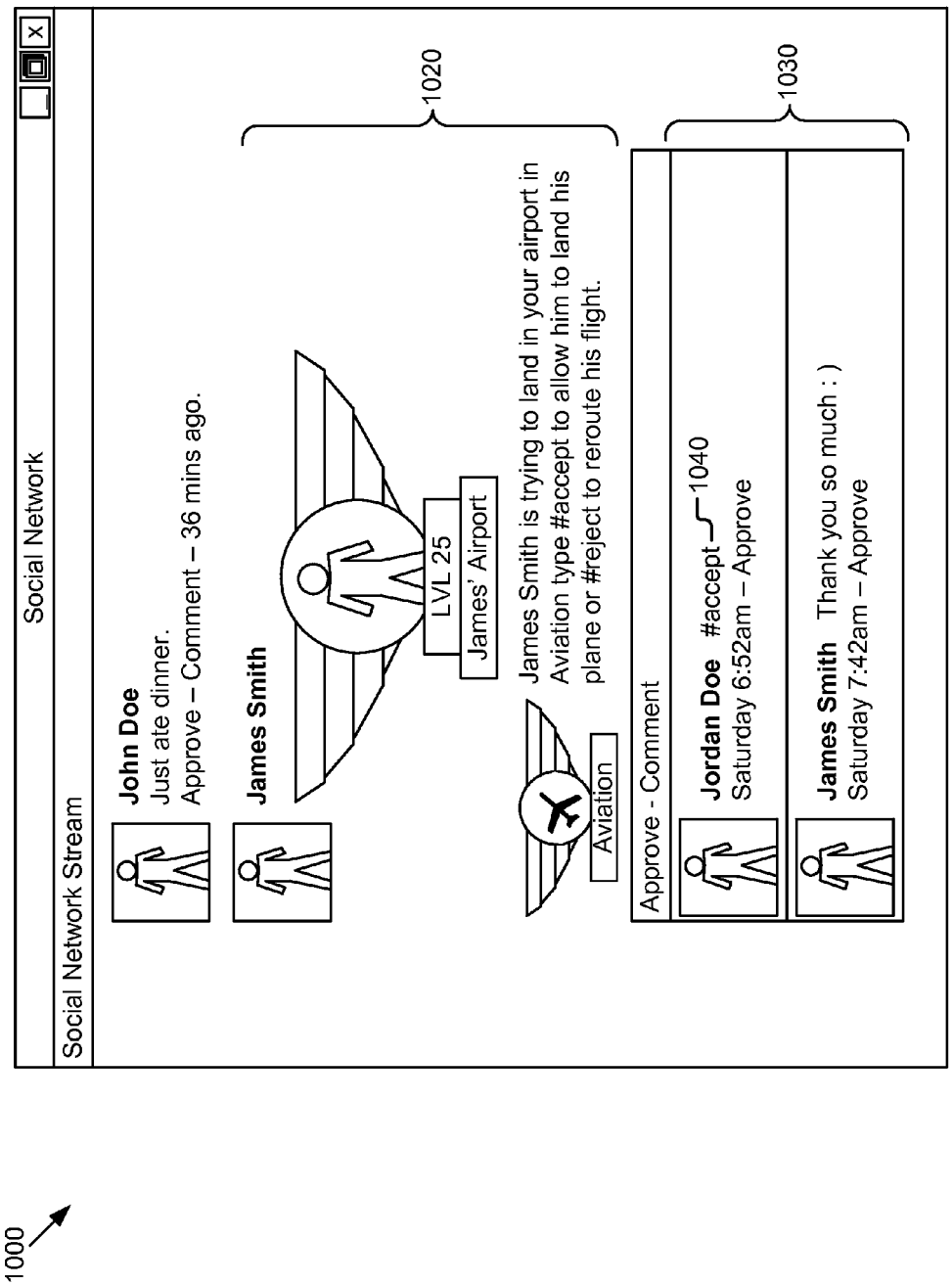
FIG. 10 is a graphical representation illustrating an example user interface configured within a social network for accepting requests for user game play within a game.

FIG. 10 illustrates an example of the user interface display 1000 to a user in the event a video gaming application is hosted or accessed by a social network. A user may accept a request via posting a comment (#accept in this example) to the social network post. User posts are indicated by 1010, user activities or operations during play are indicated by 1020, and user acceptances (indicated by reference numeral 1040) and approvals are indicated by reference numeral 1030.

Figure 11:
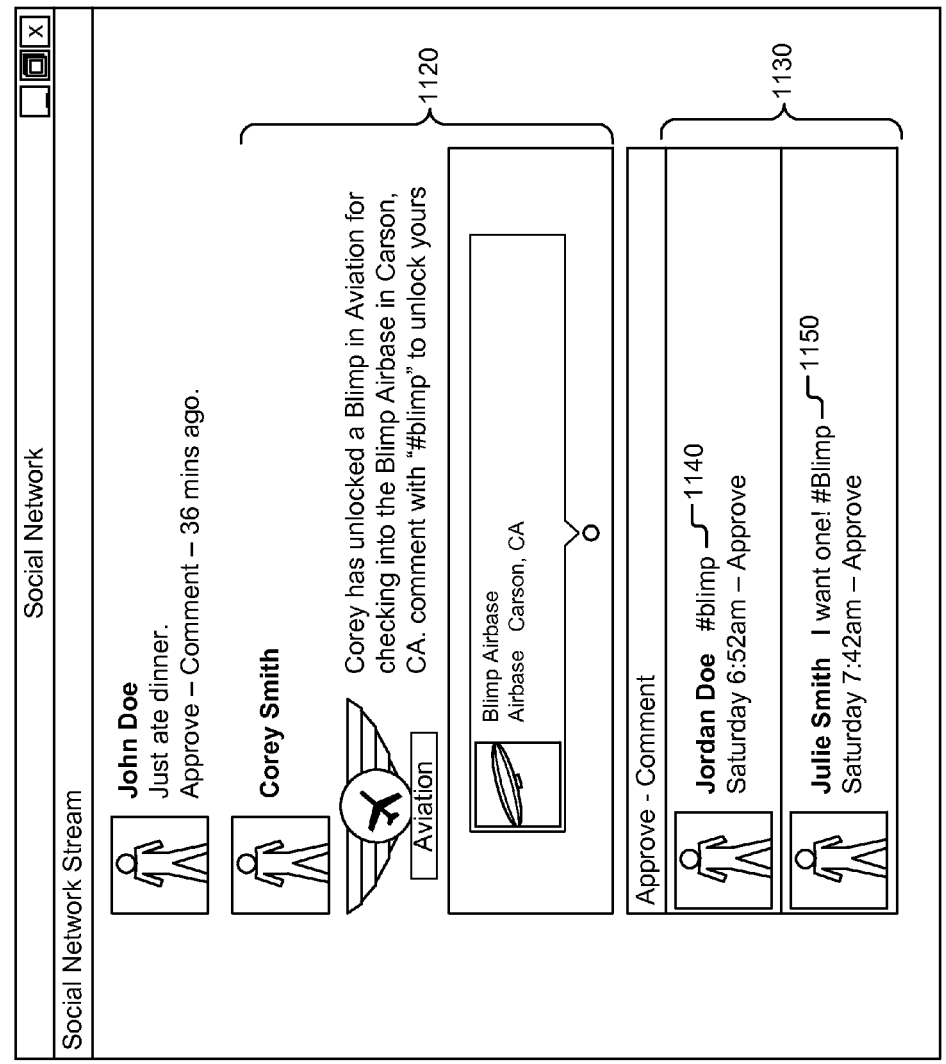
FIG. 11 is a graphical representation illustrating an example user interface for interacting with a game via a social network including unlocking new content.

FIG. 11 illustrates an example of a user interface 1100 for unlocking game play content within the game. A user may unlock in-game content by posting a comment on a player's social network post. A friend's activities and status during a game are indicated by 1120, and promotion approvals are indicated by 1130. Approvals may be by the user's friends 1140 and 1150.

Figure 12A:
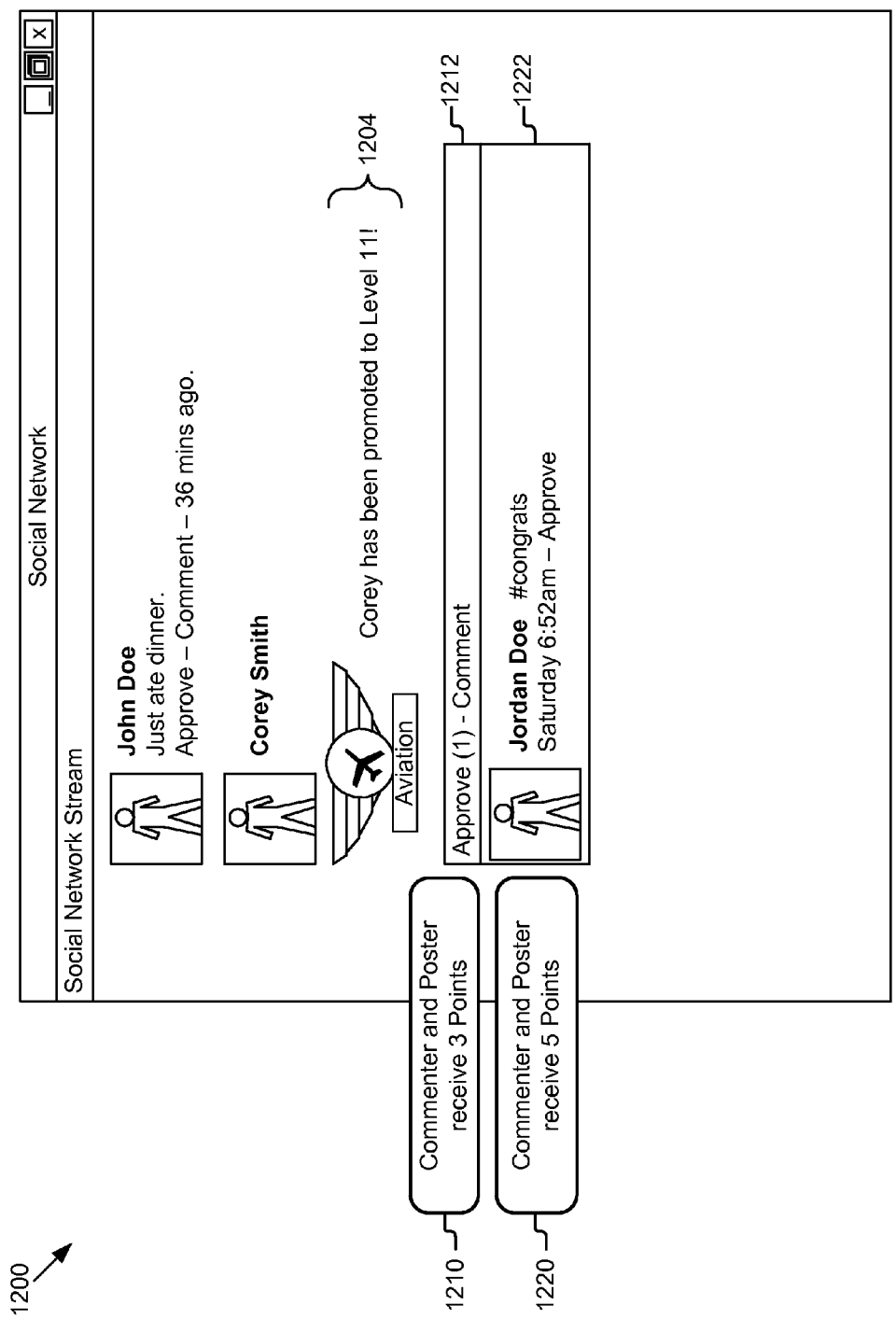
FIG. 12A is a graphical representation illustrating an example user interface display within a social network with a player's notification about one player's promotion within the game and other player comments on the player notification.

FIG. 12A illustrates an example of a user interface 1200 within a social network with a player notification about one player's promotion within the game and other player comments on the player notification. For example, the post 1204 indicates that the player has been promoted within the game. The notification 1210 indicates that for the approval 1212 from a player, the commenter and the poster receive three points within the game. The notification 1220 indicates that for the comment 1222, the commenter and the poster receive five points within the game.

Figure 12B:
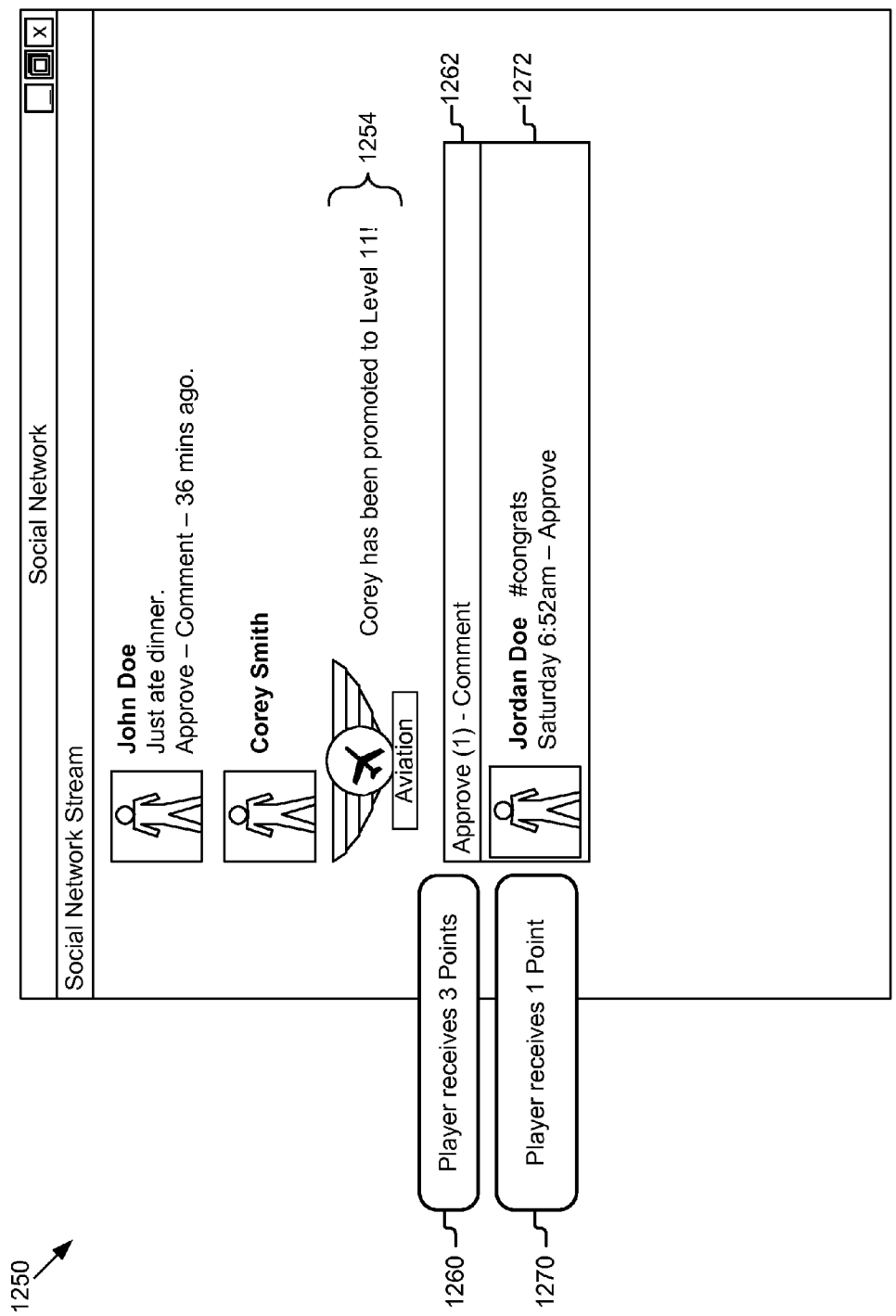
FIG. 12B is a graphical representation illustrating an example user interface display within a social network with a player notification about one player's promotion within the game and other non-player comments on the player notification.

FIG. 12B illustrates an example of a user interface 1250 within a social network with a player notification about one player's promotion within the game and other non-player comments on the player notification. For example, the post 1254 indicates that the player has been promoted within the game. The notification 1260 indicates that for the approval 1262, the player (i.e., poster) receives three points within the game. The notification 1270 indicates that for the comment 1272 from a non-player, the player (i.e., poster) receives one point within the game.

Figure 13A:
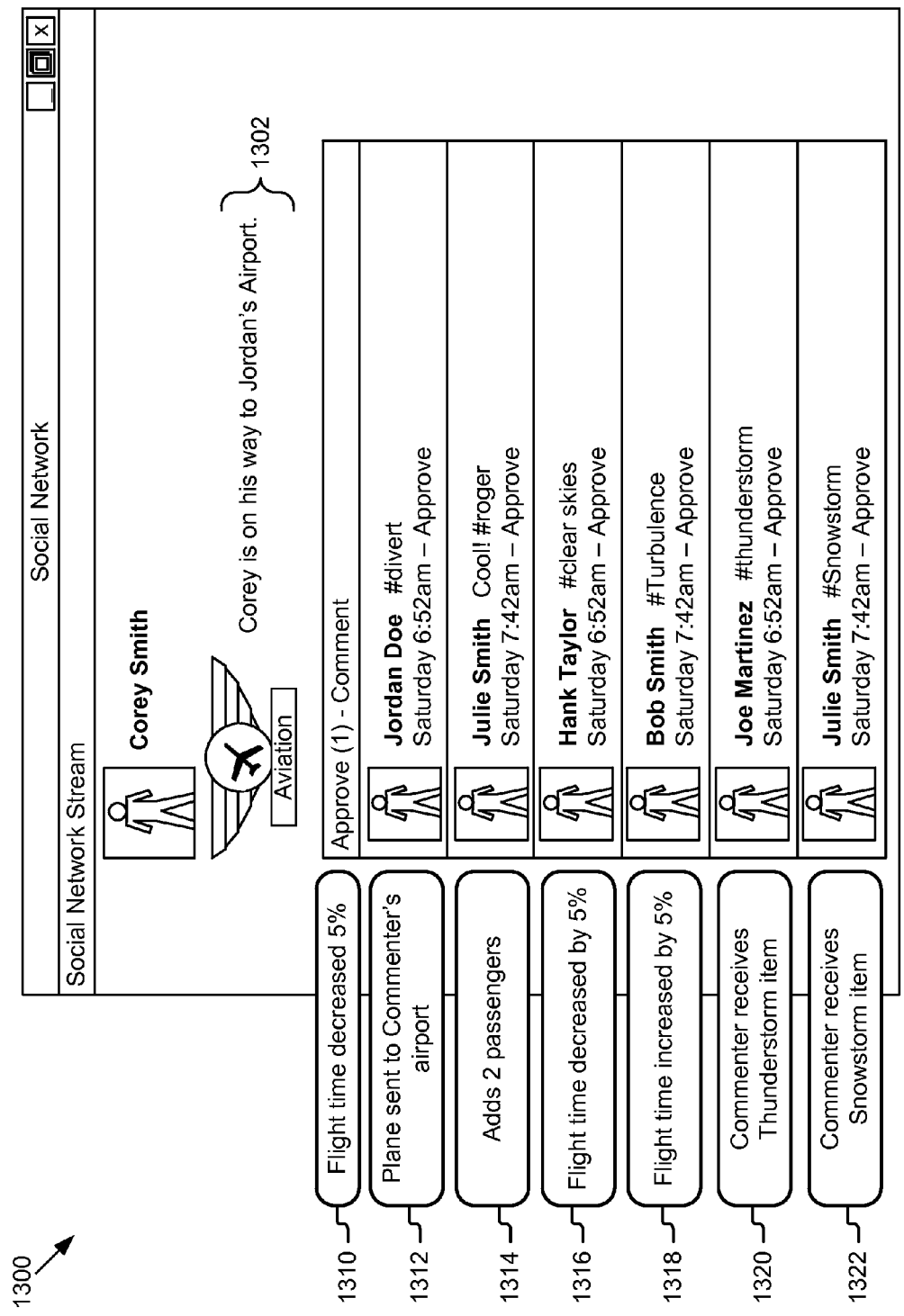
FIG. 13A is a graphical representation illustrating an example use interface within a social network with a player notification on a particular player traveling to another player's area within the game and posting of other player comments further to the player notification.

FIG. 13A illustrates an example of a user interface 1300 within a social network with a player notification about one player traveling to another player's area within the game and other player comments on the player notification. For example, the post 1302 indicates that the player is traveling to another player's airport. The notification 1310 indicates that for the approval, the flight time is decreased by 5%. The notification 1312 indicates that for the comment "#divert" from a player, the airplane is sent to the commenter's airport. The notification 1314 indicates that for the comment "#roger" from a player, the airplane receives two passengers. The notification 1316 indicates that for the comment "#clear skies" from a player, the flight time is decreased by 5%. The notification 1318 indicates that for the comment "#turbulence" from a player, the flight time is increased by 5%. The notification 1320 indicates that for the comment "#thunderstorm" from a player, the commenter receives a thunderstorm item (in-game item). The notification 1322 indicates that for the comment "#snowstorm" from a player, the commenter receives a snowstorm item (in-game item).

Figure 13B:
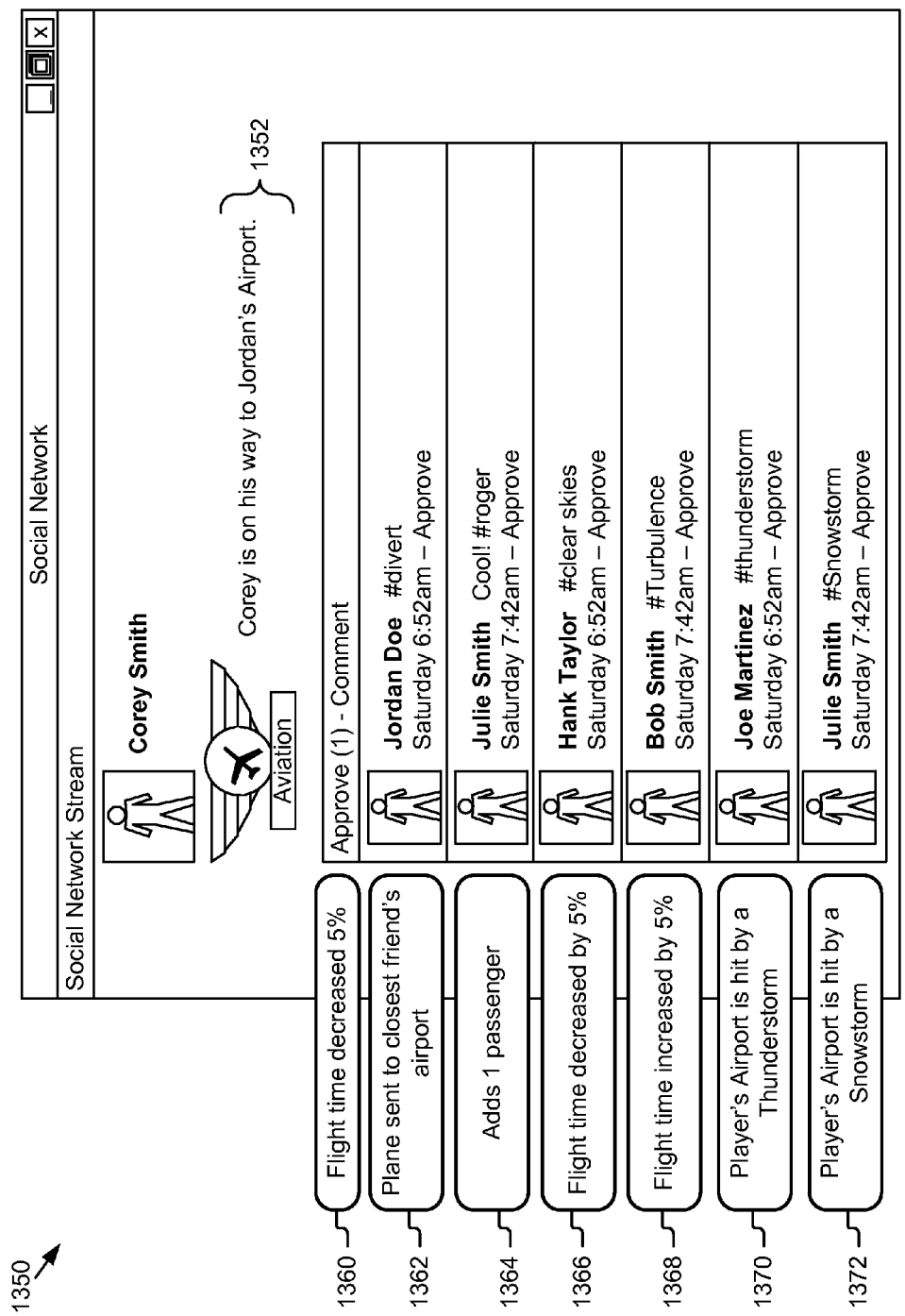
FIG. 13B is a graphical representation illustrating an example user interface for interacting with a game via a social network including non-players commenting on a player's activity within the game.

FIG. 13B illustrates an example of a user interface 1350 within a social network with a player notification about one player traveling to another player's area within the game and other non-player comments on the player notification. For example, the post 1352 indicates that the player is traveling to another player's airport. The notification 1360 indicates that for the approval, the flight time is decreased by 5%. The notification 1362 indicates that for the comment "#divert" from a non-player, the airplane is sent to the closest friend's airport. The notification 1364 indicates that for the comment "#roger" from a non-player, the airplane receives one passenger. The notification 1366 indicates that for the comment "#clear skies" from a non-player, the flight time is decreased by 5%. The notification 1368 indicates that for the comment "#turbulence" from a non-player, the flight time is increased by 5%. The notification 1370 indicates that for the comment "#thunderstorm" from a non-player, the player's airport is hit by a thunderstorm. The notification 1372 indicates that for the comment "#snowstorm" from a non-player, the player's airport is hit by a snowstorm.

Figure 14A:
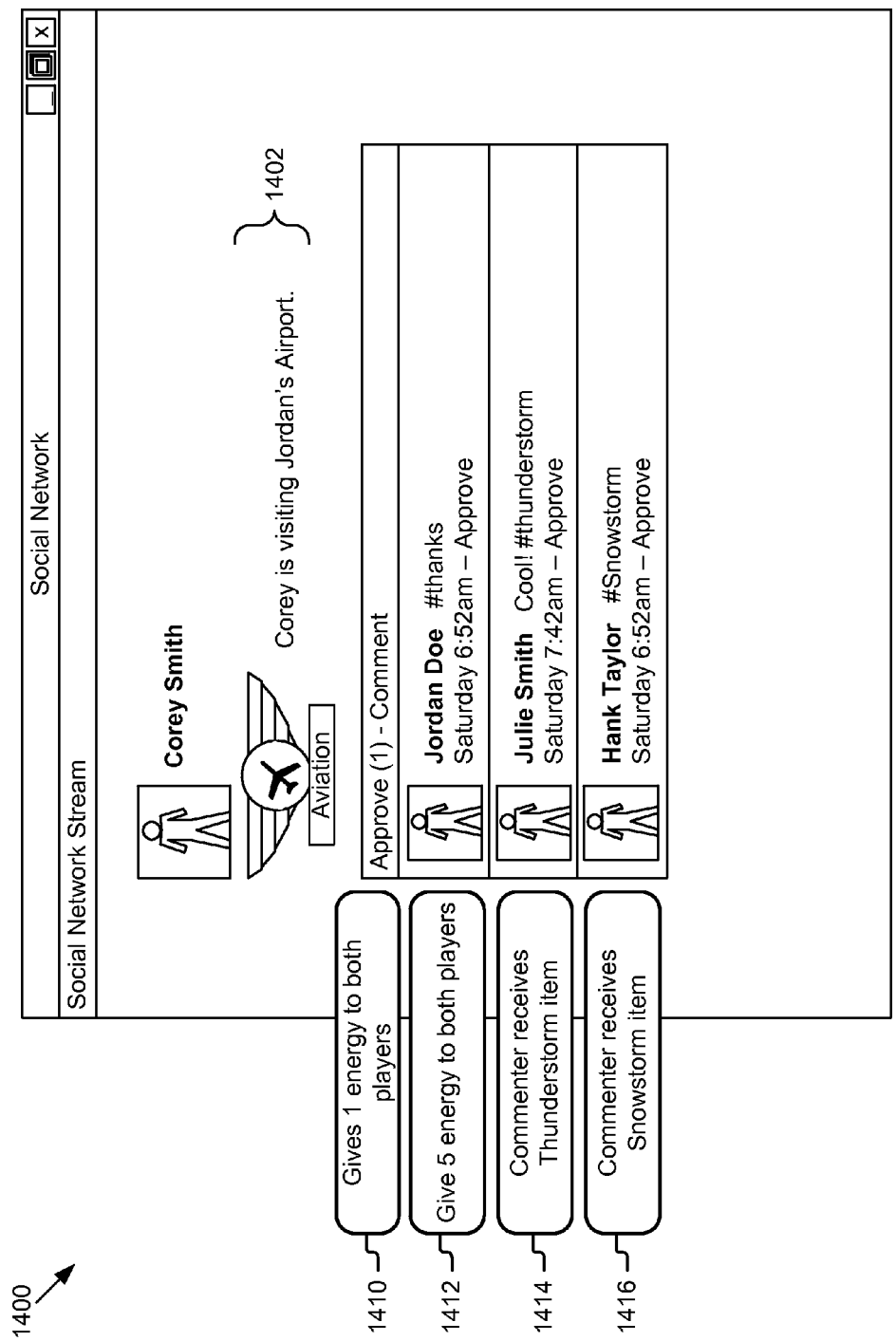
FIG. 14A is a graphical representation illustrating an example user interface for interacting with a game via a social network including players commenting on a player visiting a player's virtual area within the game.

FIG. 14A illustrates an example of a user interface 1400 within a social network with a player notification about one player visiting another player's area within the game and other player comments on the player notification. For example, the post 1402 indicates that the player is visiting another player's airport. The notification 1410 indicates that for the approval, one energy point is given to both players. The notification 1412 indicates that for the comment "#thanks" from a player, five energy points are given to both players. The notification 1414 indicates that for the comment "#thunderstorm" from a player, the commenter receives a thunderstorm item (in-game item). The notification 1416 indicates that for the comment "#snowstorm" from a player, the commenter receives a snowstorm item (in-game item).

Figure 14B:
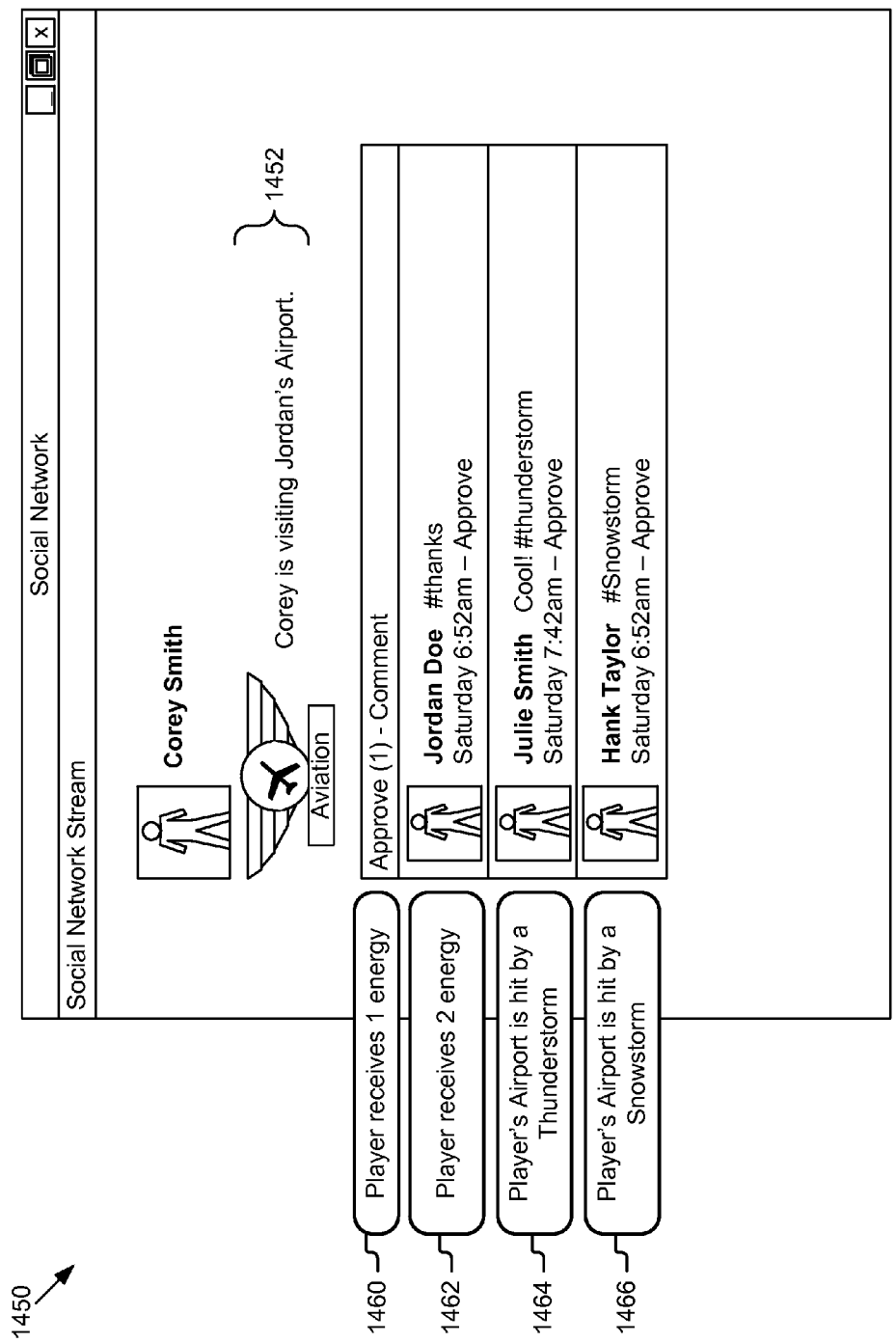
FIG. 14B is a graphical representation illustrating an example user interface for interacting with a game via a social network including non-players commenting on a player visiting a player's virtual area within the game.

FIG. 14B illustrates an example of a user interface 1450 within a social network with a player notification about one player visiting another player's area within the game and other non-player comments on the player notification. For example, the post 1452 indicates that the player is visiting another player's airport. The notification 1460 indicates that for the approval, one energy point is given to the player (i.e., poster). The notification 1462 indicates that for the comment "#thanks" from a non-player, two energy points are given to the player (i.e., poster). The notification 1464 indicates that for the comment "#thunderstorm" from a non-player, the player's (i.e., poster) airport is hit by a thunderstorm. The notification 1466 indicates that for the comment "#snowstorm" from a non-player, the player's (i.e., poster) airport is hit by a snowstorm.

Figure 15A:
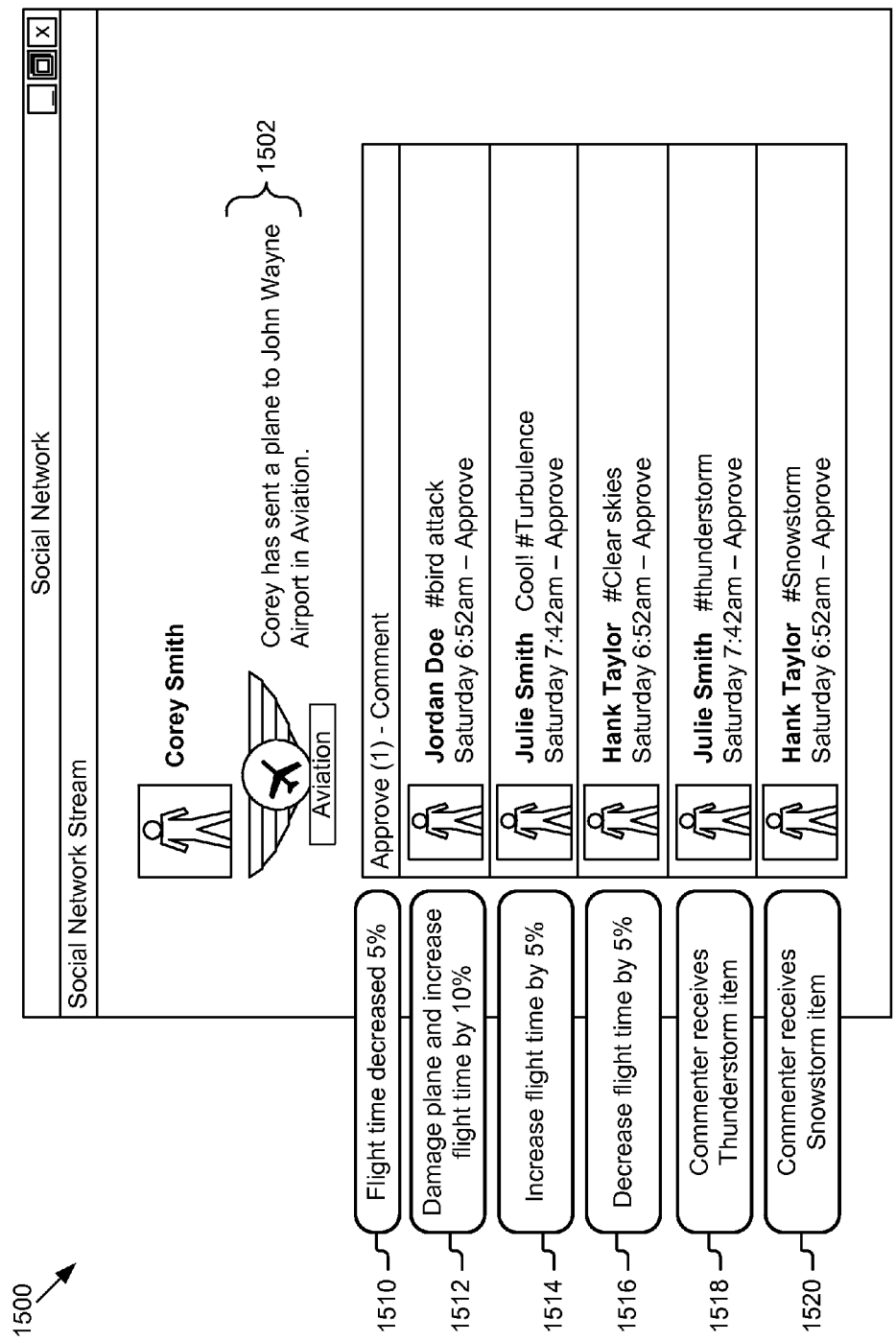
FIG. 15A is a graphical representation illustrating an example user interface for interacting with a game via a social network including players commenting on a player sending items within the game.

FIG. 15A illustrates an example of a user interface 1500 within a social network with a player notification about one player sending a game-play item within the game and other player comments on the player notification. For example, the post 1502 indicates that the player has sent an airplane to an in-game airport (in this example John Wayne Airport). The notification 1510 indicates that for the approval, the flight time is decreased by 5%. The notification 1512 indicates that for the comment "#bird attack" from a player, the airplane is damaged and the flight time is increased by 5%. The notification 1514 indicates that for the comment "#turbulence" from a player, the flight time is increased by 5%. The notification 1516 indicates that for the comment "#clear skies" from a player, the flight time is decreased by 5%. The notification 1518 indicates that for the comment "#thunderstorm" from a player, the commenter receives a thunderstorm item (in-game item). The notification 1520 indicates that for the comment "#snowstorm" from a player, the commenter receives a snowstorm item (in-game item).

Figure 15B:
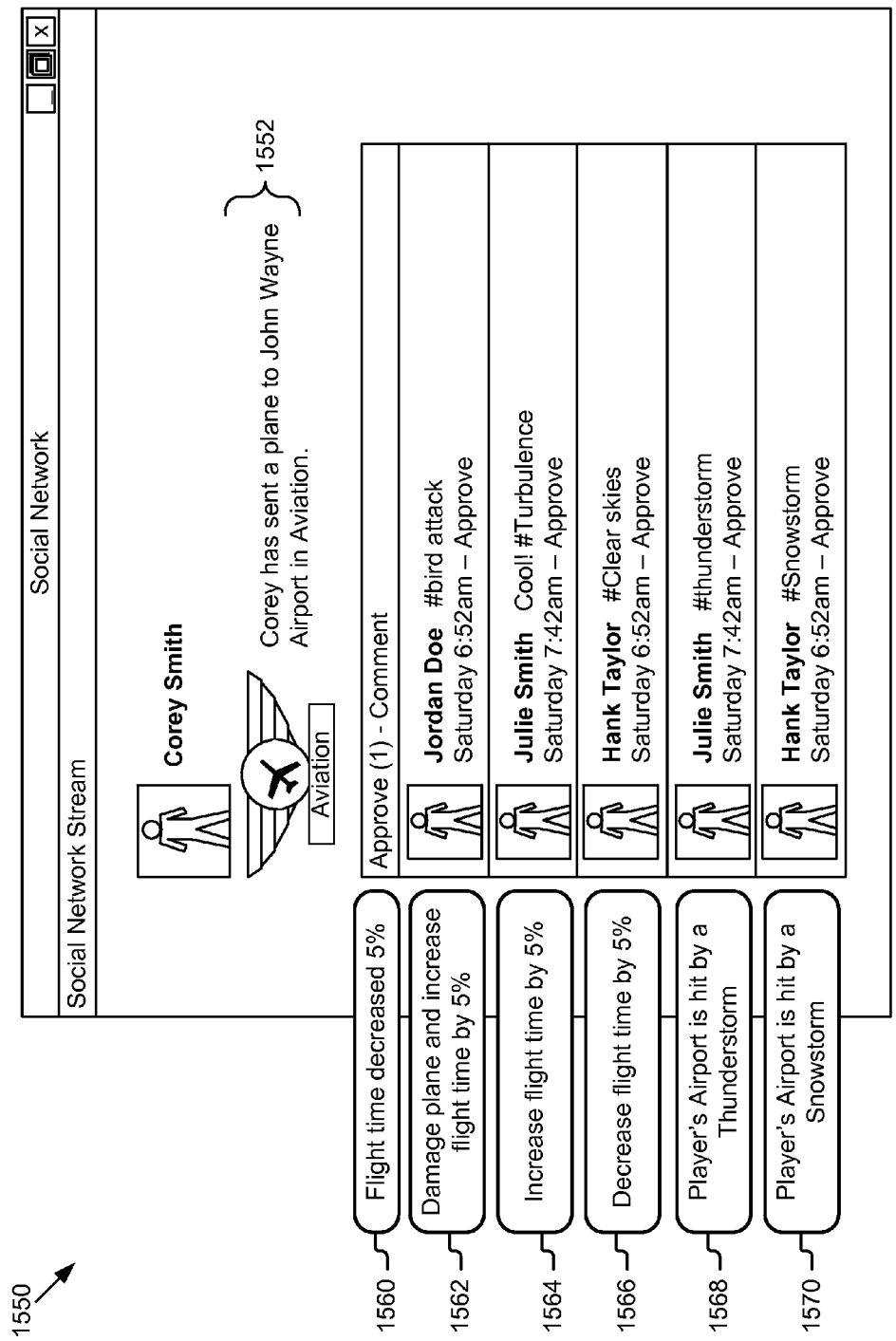
FIG. 15B is a graphical representation illustrating an example user interface for interacting with a game via a social network including comments from non-players on a player sending items within the game.

FIG. 15B illustrates an example of a user interface 1550 within a social network with a player notification about one player sending a game-play item within the game and other non-player comments on the player notification. For example, the post 1552 indicates that the player has sent an airplane to an in-game airport (in this example John Wayne Airport). The notification 1560 indicates that for the approval, the flight time is decreased by 5%. The notification 1562 indicates that for the comment "#bird attack" from a non-player, the airplane is damaged and the flight time is increased by 5%. The notification 1564 indicates that for the comment "#turbulence" from a non-player, the flight time is increased by 5%. The notification 1566 indicates that for the comment "#clear skies" from a non-player, the flight time is decreased by 5%. The notification 1568 indicates that for the comment "#thunderstorm" from a non-player, the player's (i.e., poster) airport is hit by a thunderstorm. The notification 1570 indicates that for the comment "#snowstorm" from a non-player, the player's (i.e., poster) airport is hit by a snowstorm.

Figure 16A:
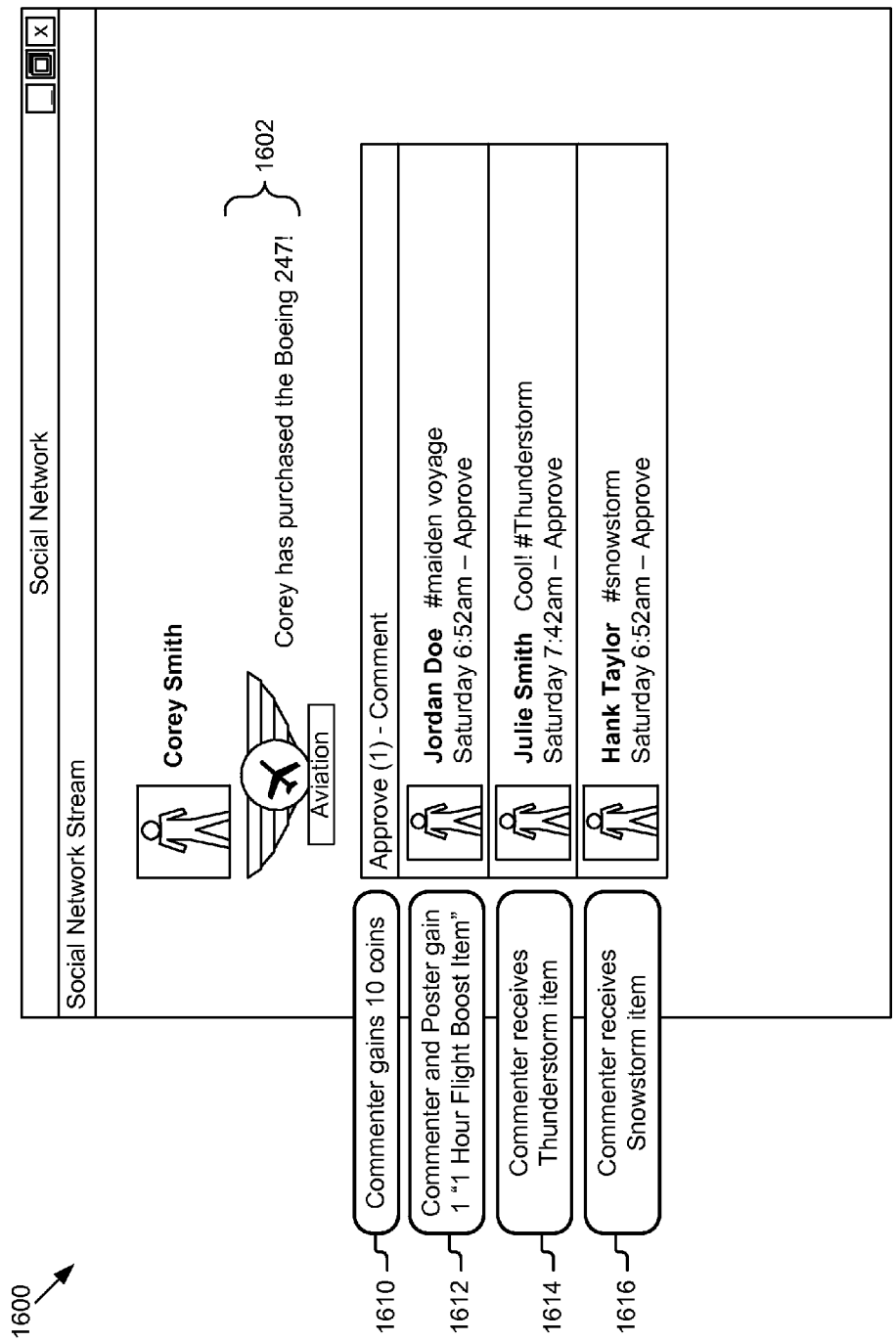
FIG. 16A is a graphical representation illustrating an example user interface for interacting with a game via a social network including players commenting on an item purchase within the game.

FIG. 16A illustrates an example of a user interface 1600 within a social network with a player notification about one player purchasing a game-play item within the game and other player comments on the player notification. For example, the post 1602 indicates that the player has purchased an in-game airplane. The notification 1610 indicates that for the approval, the commenter gains 10 coins. The notification 1612 indicates that for the comment "#maiden voyage" from a player, the commenter and the poster gain one "1 hour boost item". The notification 1614 indicates that for the comment "#thunderstorm" from a player, the commenter receives a thunderstorm item (in-game item). The notification 1616 indicates that for the comment "#snowstorm" from a player, the commenter receives a snowstorm item (in-game item).

Figure 16B:
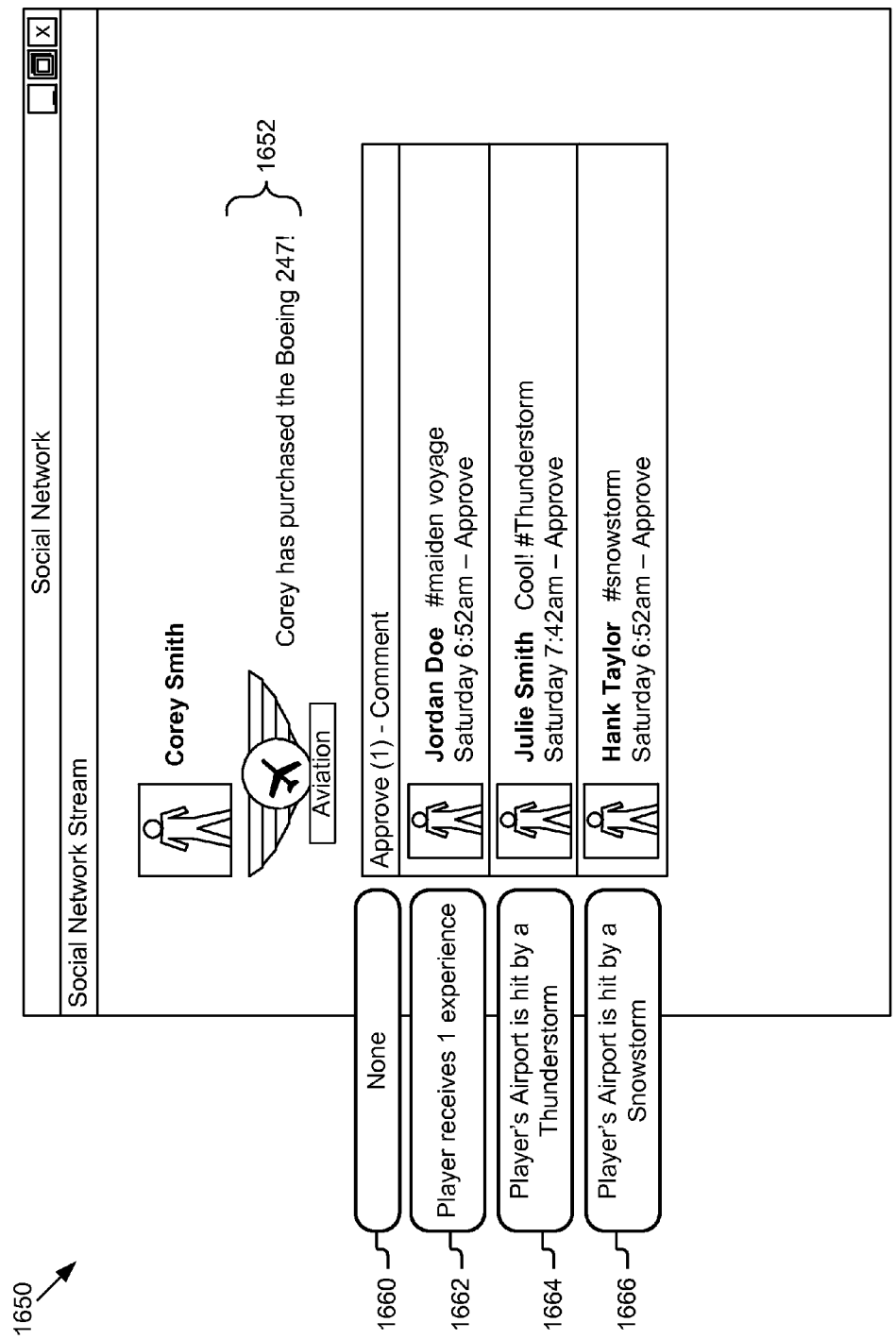
FIG. 16B is a graphical representation illustrating an example user interface for interacting with a game via a social network including non-players commenting on an item purchase within the game.

FIG. 16B illustrates an example of a user interface 1650 within a social network with a player notification about one player purchasing a game-play item within the game and other non-player comments on the player notification. For example, the post 1652 indicates that the player has purchased an in-game airplane. The notification 1660 indicates that for the approval, no award is given. The notification 1662 indicates that for the comment "#maiden voyage" from a non-player, the player (i.e., poster) receives one experience point. The notification 1664 indicates that for the comment "#thunderstorm" from a non-player, the player's (i.e., poster) airport is hit by a thunderstorm. The notification 1666 indicates that for the comment "#snowstorm" from a non-player, the player's (i.e., poster) airport is hit by a snowstorm.

Figure 17A:
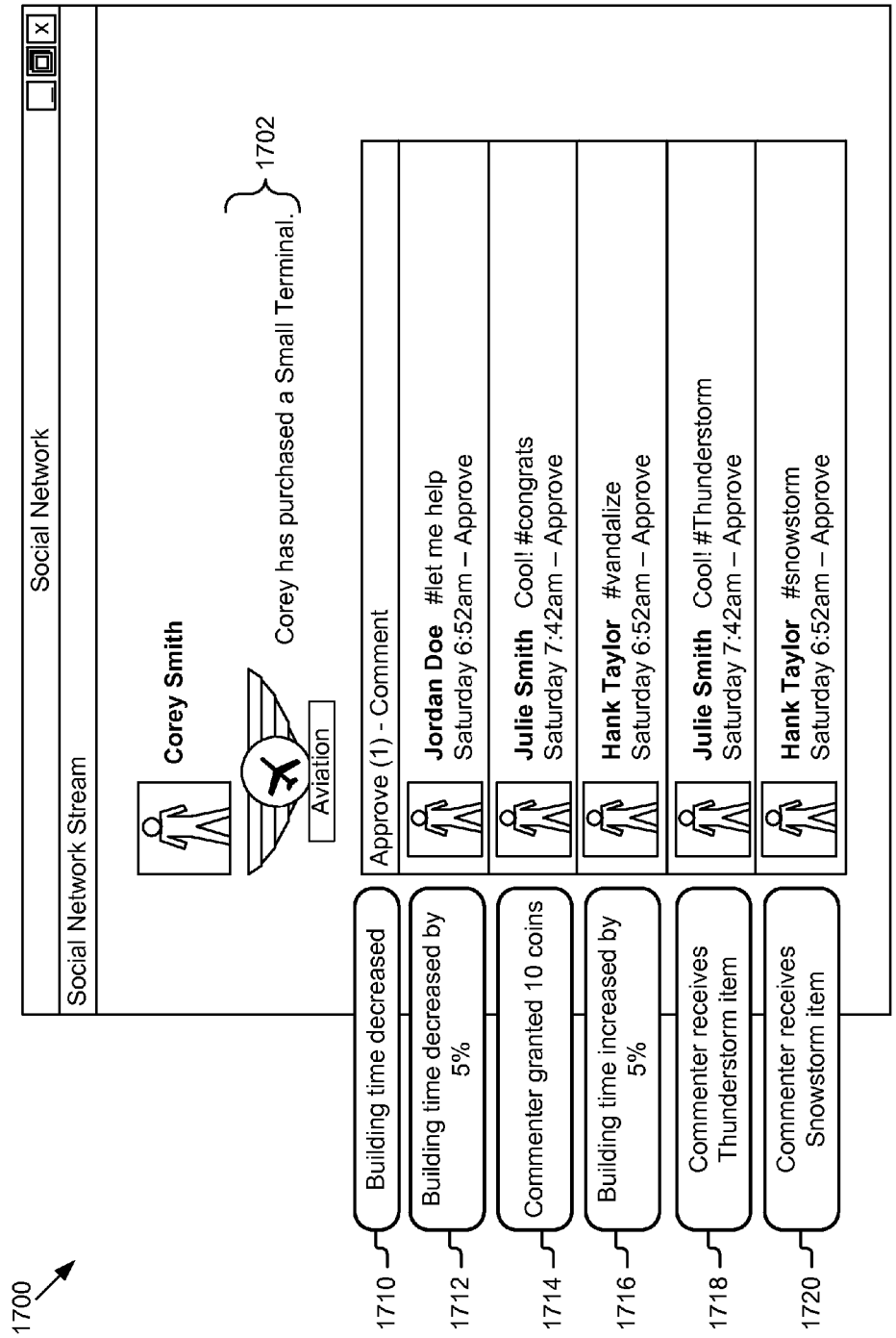
FIG. 17A is a graphical representation illustrating an example user interface for interacting with a game via a social network including players commenting on an area purchase within the game.

FIG. 17A illustrates an example of a user interface 1700 within a social network with a player notification about one player purchasing a game-play area within the game and other player comments on the player notification. For example, the post 1702 indicates that the player has purchased a small terminal. The notification 1710 indicates that for the approval, the building time is decreased. The notification 1712 indicates that for the comment "#let me help" from a player, the building time is decreased by 5%. The notification 1714 indicates that for the comment "#congrats" from a player, the commenter is given 10 coins. The notification 1716 indicates that for the comment "#vandalize" from a player, the building time is increased by 5%. The notification 1718 indicates that for the comment "#thunderstorm" from a player, the commenter receives a thunderstorm item (in-game item). The notification 1720 indicates that for the comment "#snowstorm" from a player, the commenter receives a snowstorm item (in-game item).

Figure 17B:
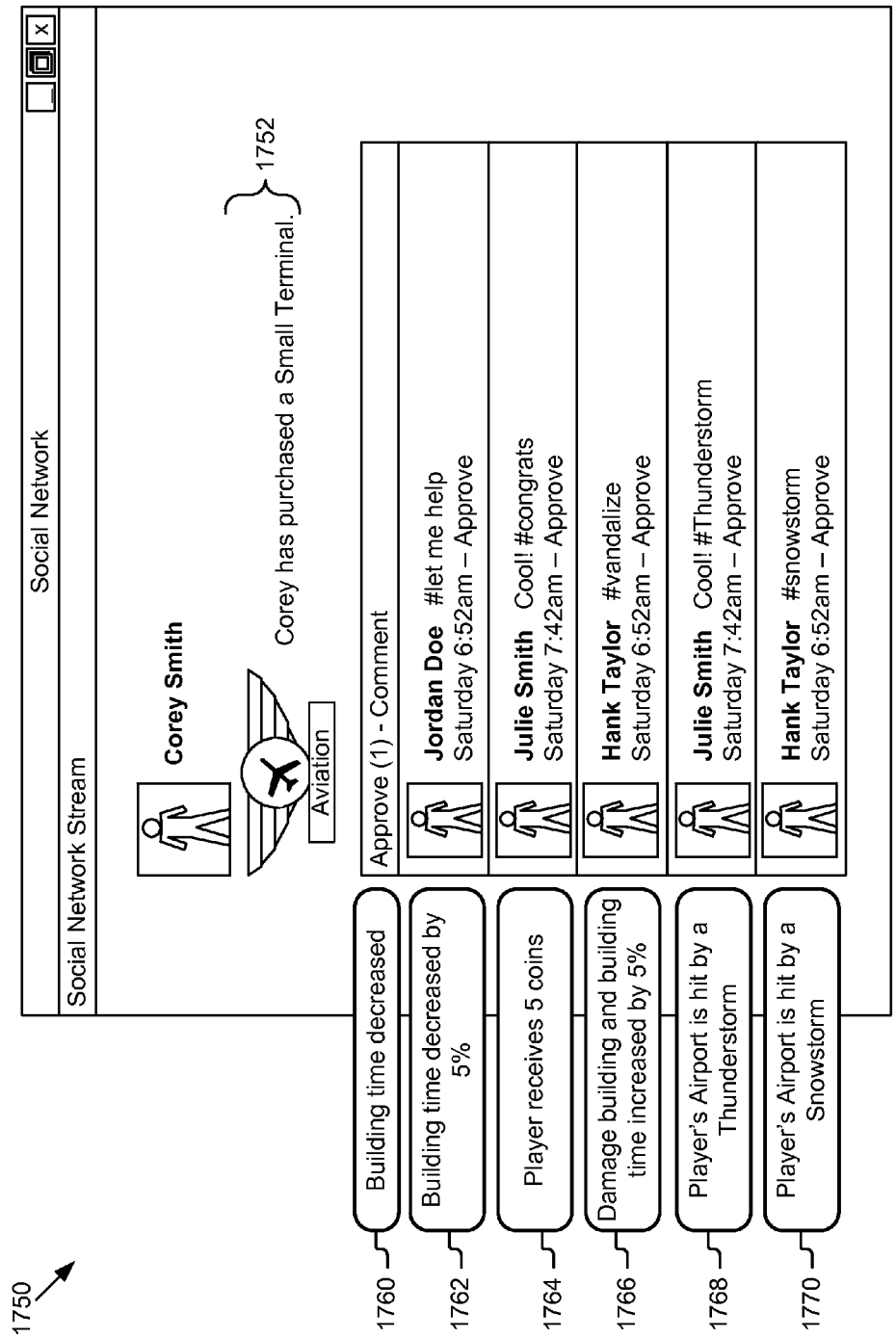
FIG. 17B is a graphical representation illustrating an example user interface for interacting with a game via a social network including non-players commenting on an area purchase within the game.

FIG. 17B illustrates an example of a user interface 1750 within a social network with a player notification about one player purchasing a game-play area within the game and other non-player comments on the player notification. For example, the post 1752 indicates that the player has purchased a small terminal. The notification 1760 indicates that for the approval, the building time is decreased. The notification 1762 indicates that for the comment "#let me help" from a non-player, the building time is decreased by 5%. The notification 1764 indicates that for the comment "#congrats" from a non-player, the player (i.e., poster) is given 5 coins. The notification 1766 indicates that for the comment "#vandalize" from a non-player, the building is damaged and the building time is increased by 5%. The notification 1768 indicates that for the comment "#thunderstorm" from a non-player, the player's (i.e., poster) airport is hit by a thunderstorm. The notification 1770 indicates that for the comment "#snowstorm" from a non-player, the player's (i.e., poster) airport is hit by a snowstorm.

Figure 18A:
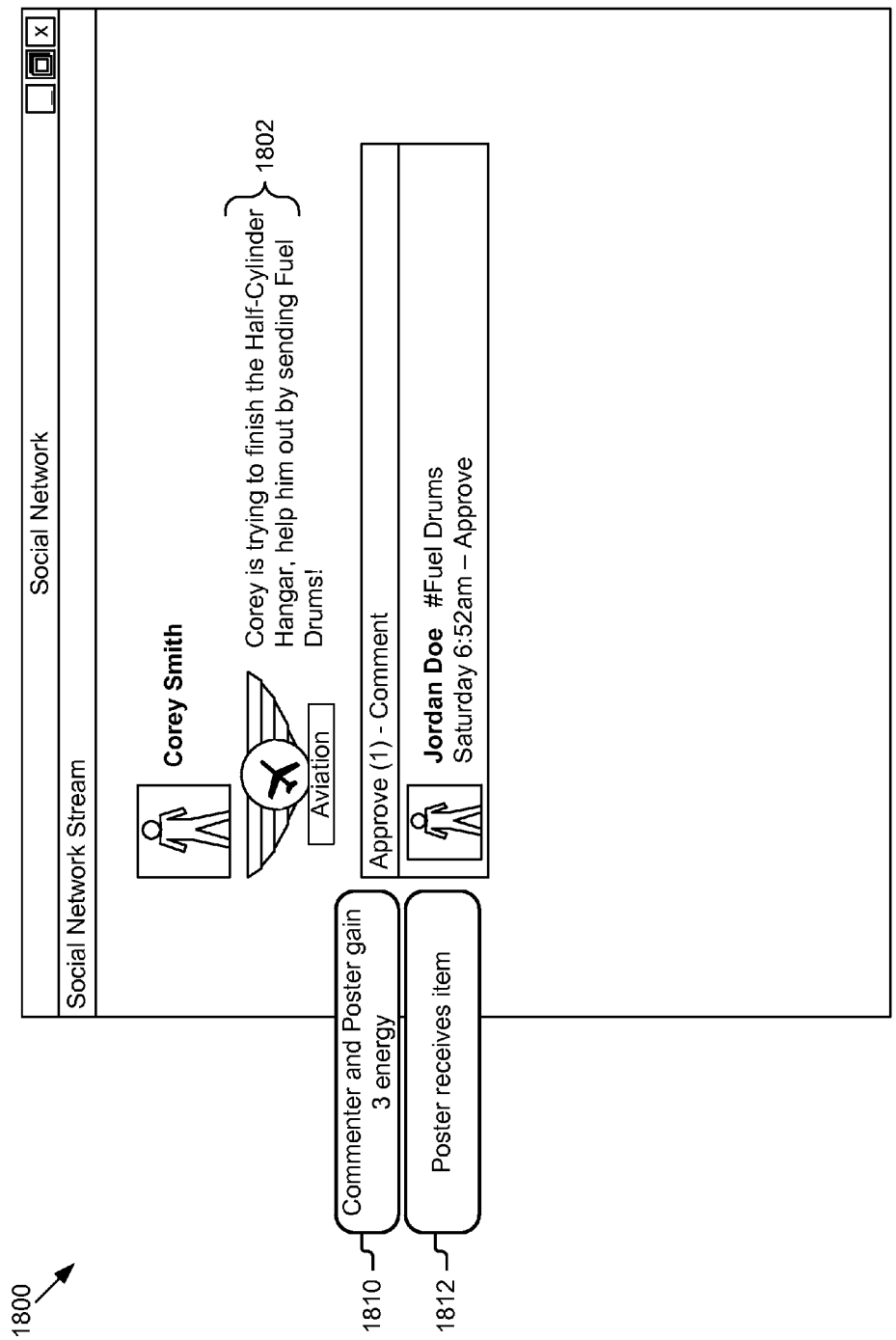
FIG. 18A is a graphical representation illustrating an example user interface for interacting with a game via a social network including players commenting on building an item within the game.

FIG. 18A illustrates an example of a user interface 1800 within a social network with a player notification about one player building a game-play item within the game and other player comments on the player notification. For example, the post 1802 indicates that the player is trying to finish building a hangar. The notification 1810 indicates that for the approval, the poster and commenter receive three energy points. The notification 1812 indicates that for the comment "#fuel drums" from a player, the poster receives an in-game item.

Figure 18B:
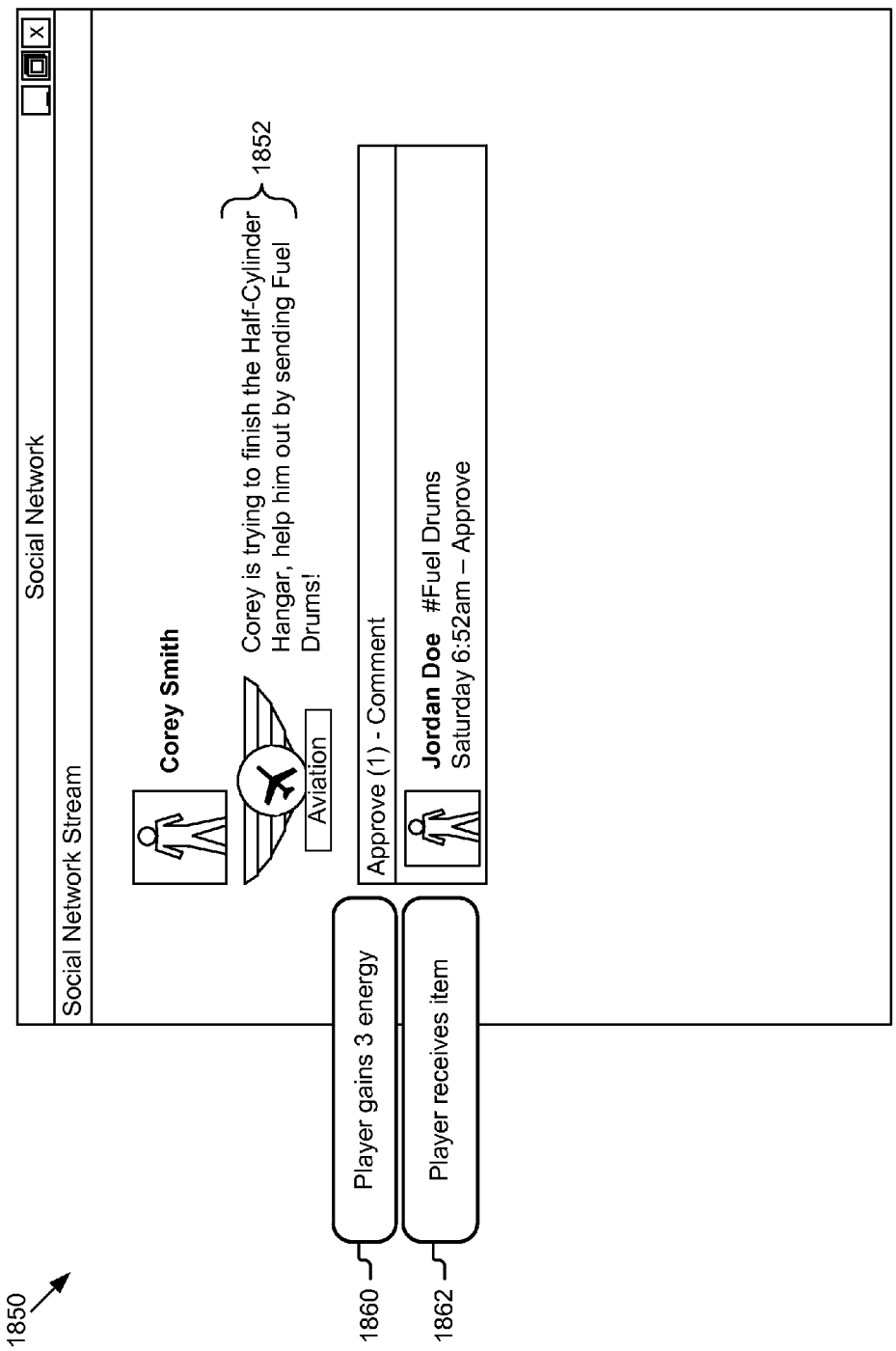
FIG. 18B is a graphical representation illustrating an example user interface for interacting with a game via a social network including non-players commenting on building an item within the game.

FIG. 18B illustrates an example of a user interface 1850 within a social network with a player notification about one player building a game-play item within the game and other non-player comments on the player notification. The notification 1860 indicates that for the approval, the player (i.e., poster) receives three energy points. The notification 1862 indicates that for the comment "#fuel drums" from a non-player, the player (i.e., poster) receives an in-game item.

Figure 19A:
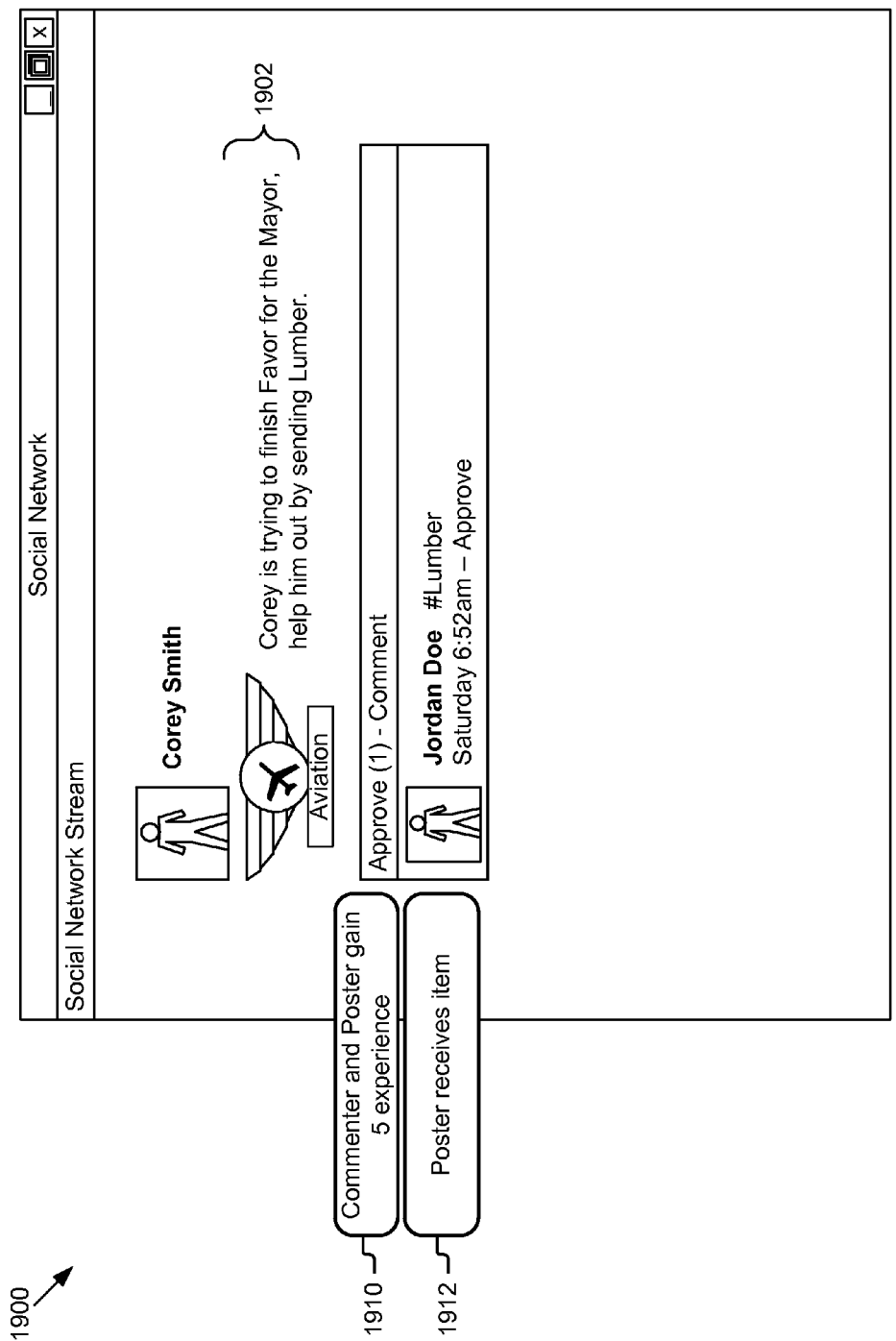
FIG. 19A is a graphical representation illustrating an example user interface for interacting with a game via a social network including players commenting on a task within the game.

FIG. 19A illustrates an example of a user interface 1900 within a social network with a player notification about one player performing a task within the game and other player comments on the player notification. For example, the post 1902 indicates that the player is trying to finish a task, in this example, "favor for the mayor." The notification 1910 indicates that for the approval, the poster and commenter receive five experience points. The notification 1912 indicates that for the comment "#lumber" from a player, the poster receives an in-game item.

Figure 19B:
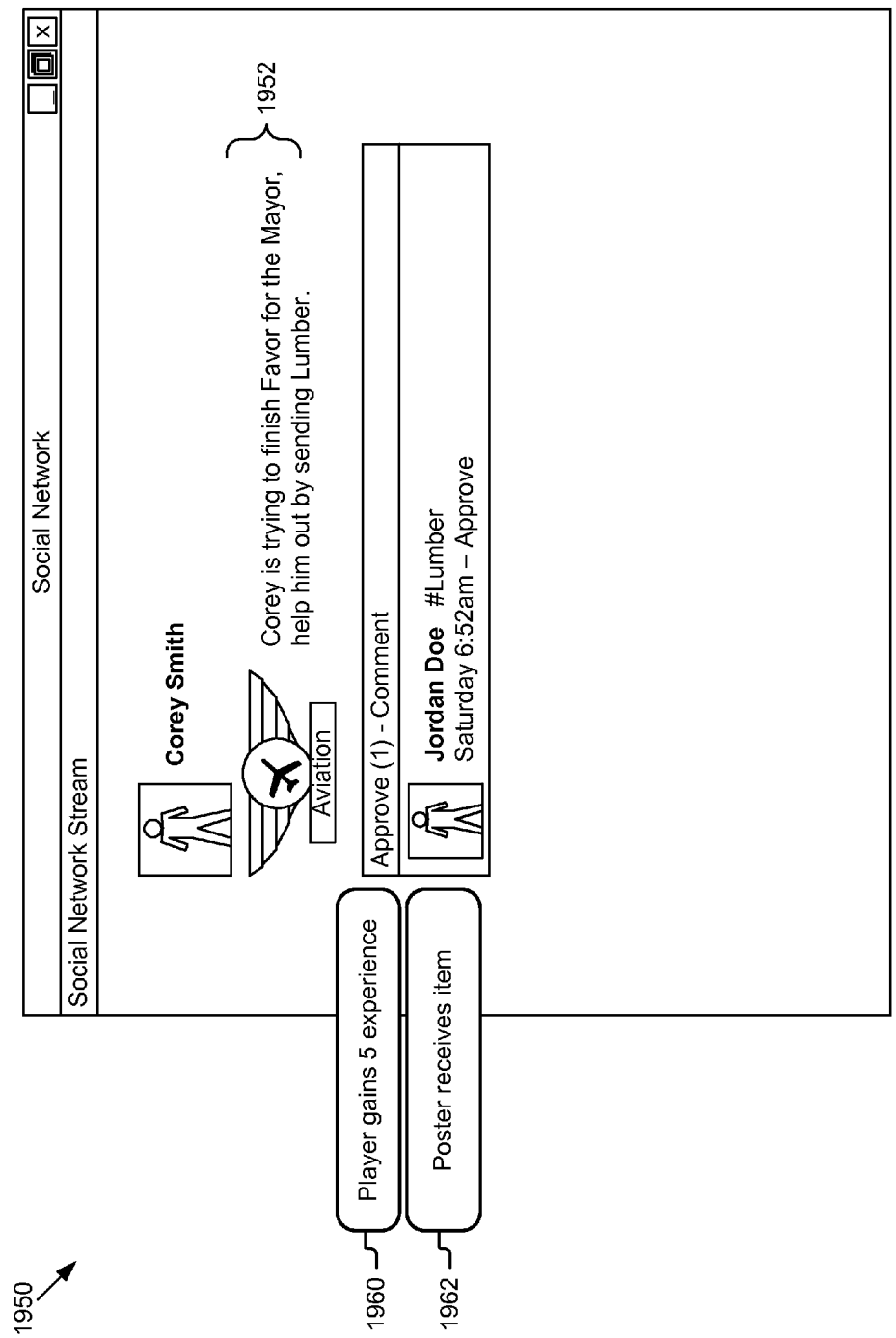
FIG. 19B is a graphical representation illustrating an example user interface for interacting with a game via a social network including non-players commenting on a task within the game.

FIG. 19B illustrates an example of a user interface 1950 within a social network with a player notification about one player performing a task within the game and other non-player comments on the player notification. For example, the post 1952 indicates that the player is trying to finish a task, in this example, "favor for the mayor." The notification 1960 indicates that for the approval, the player (i.e., poster) receives five experience points. The notification 1962 indicates that for the comment "#lumber" from a non-player, the player (i.e., poster) receives an in-game item.

Figure 20A:
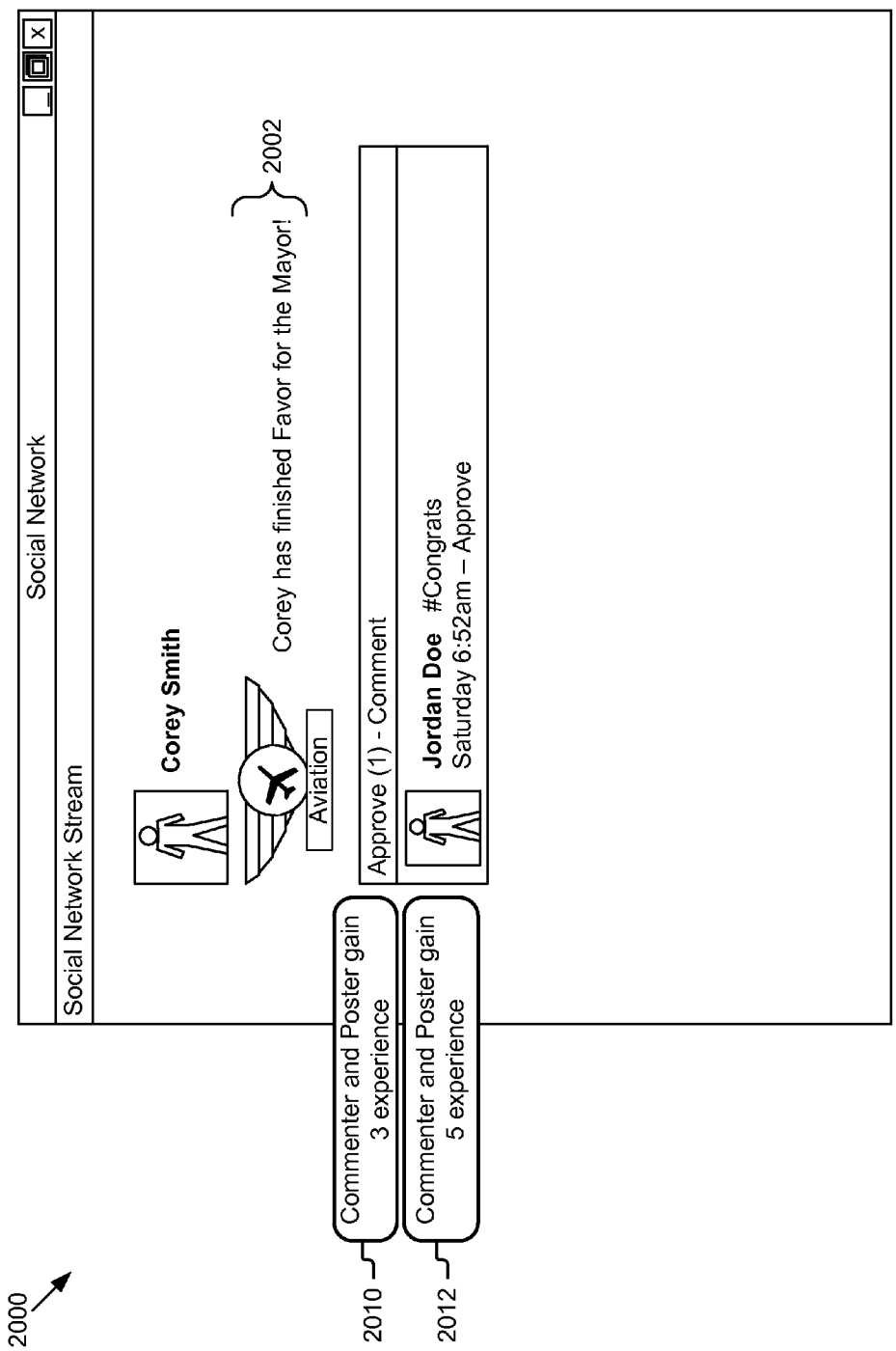
FIG. 20A is a graphical representation illustrating an example user interface for interacting with a game via a social network including players commenting on completing a task within the game.

FIG. 20A illustrates an example of a user interface 2000 within a social network with a player notification about one player finishing a task within the game and other player comments on the player notification. For example, the post 2002 indicates that the player has finished a task, in this example, "favor for the mayor." The notification 2010 indicates that for the approval, the poster and commenter receive three experience points. The notification 2012 indicates that for the comment "#congrats" from a player, the poster and commenter receive five experience points.

Figure 20B:
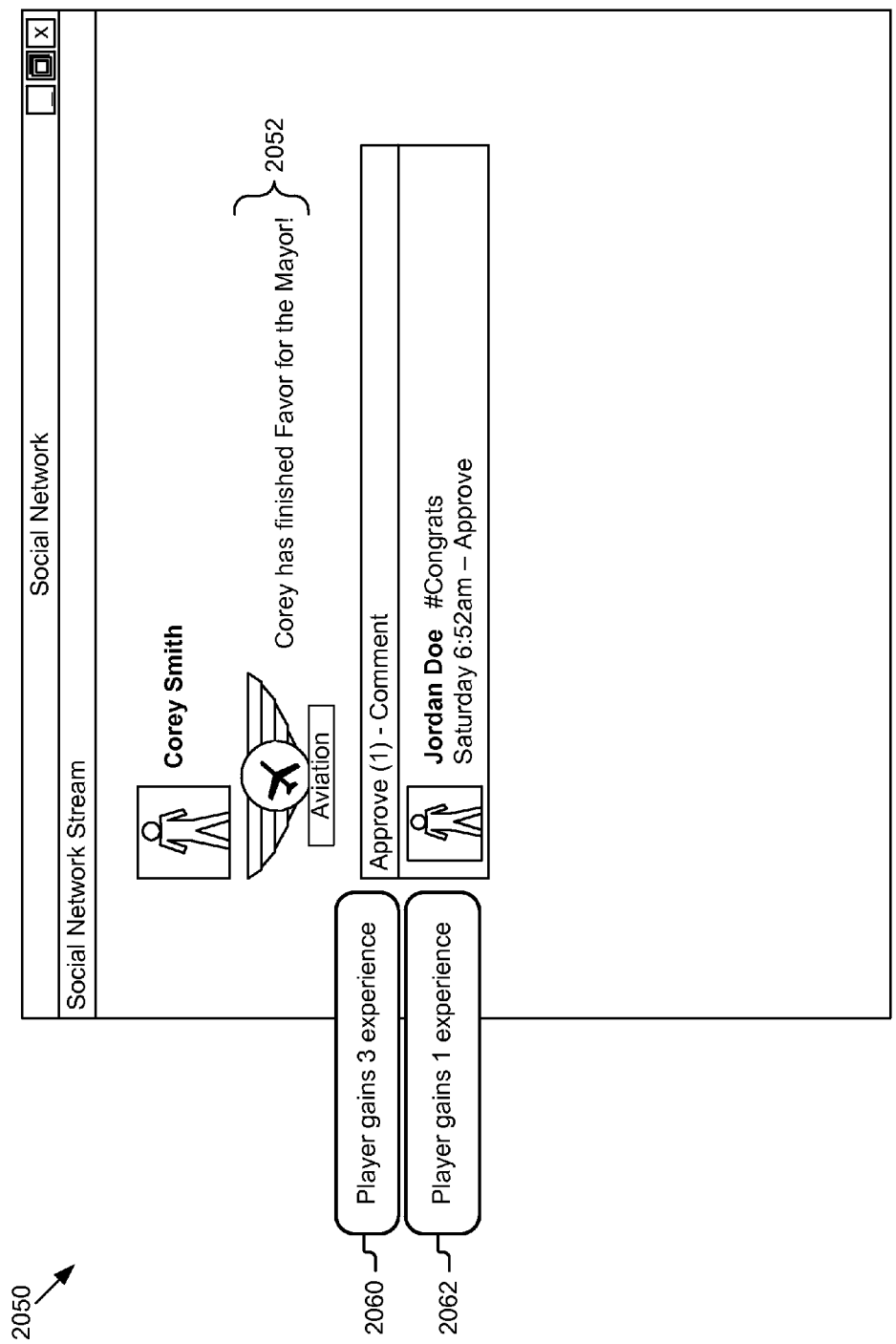
FIG. 20B is a graphical representation illustrating an example user interface for interacting with a game via a social network including non-players commenting on completing a task within the game.

FIG. 20B illustrates an example of a user interface 2050 within a social network with a player notification about one player finishing a task within the game and other non-player comments on the player notification. For example, the post 2052 indicates that the player has finished a task, in this example, "favor for the mayor." The notification 2060 indicates that for the approval, the player (i.e., poster) receives three experience points. The notification 2062 indicates that for the comment "#congrats" from a non-player, the player (i.e., poster) receives one experience point.

Figure 21A:
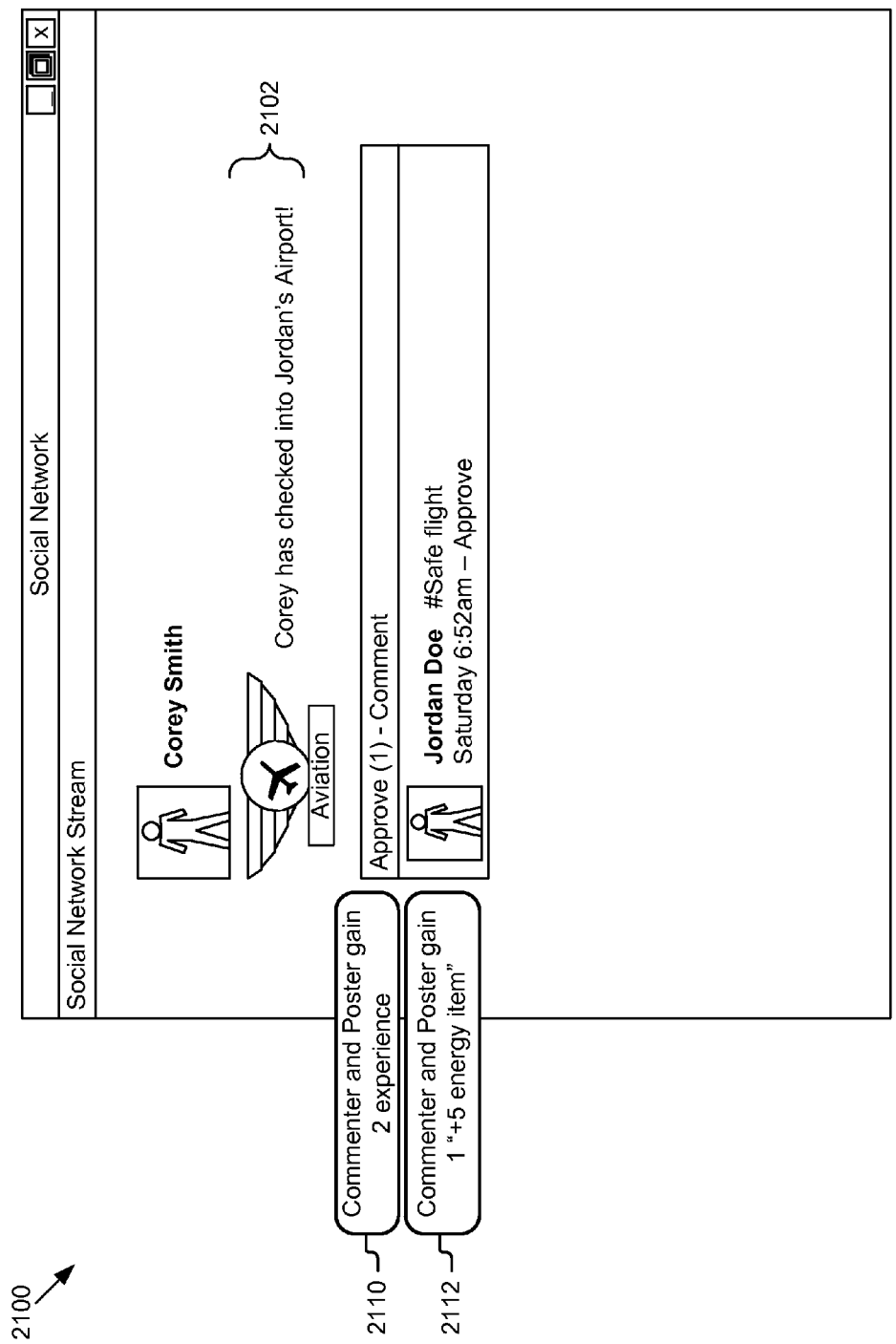
FIG. 21A is a graphical representation illustrating an example user interface for interacting with a game via a social network including players commenting on arriving at another player's virtual area within the game.

FIG. 21A illustrates an example of a user interface 2100 within a social network with a player notification about one player arriving at another player's area within the game and other player comments on the player notification. For example, the post 2102 indicates that the player has checked into a friend's airport. The notification 2110 indicates that for the approval, the poster and commenter receive two experience points. The notification 2112 indicates that for the comment "#safe flight" from a player, the poster and commenter receive one "+5 energy item."

Figure 21B:
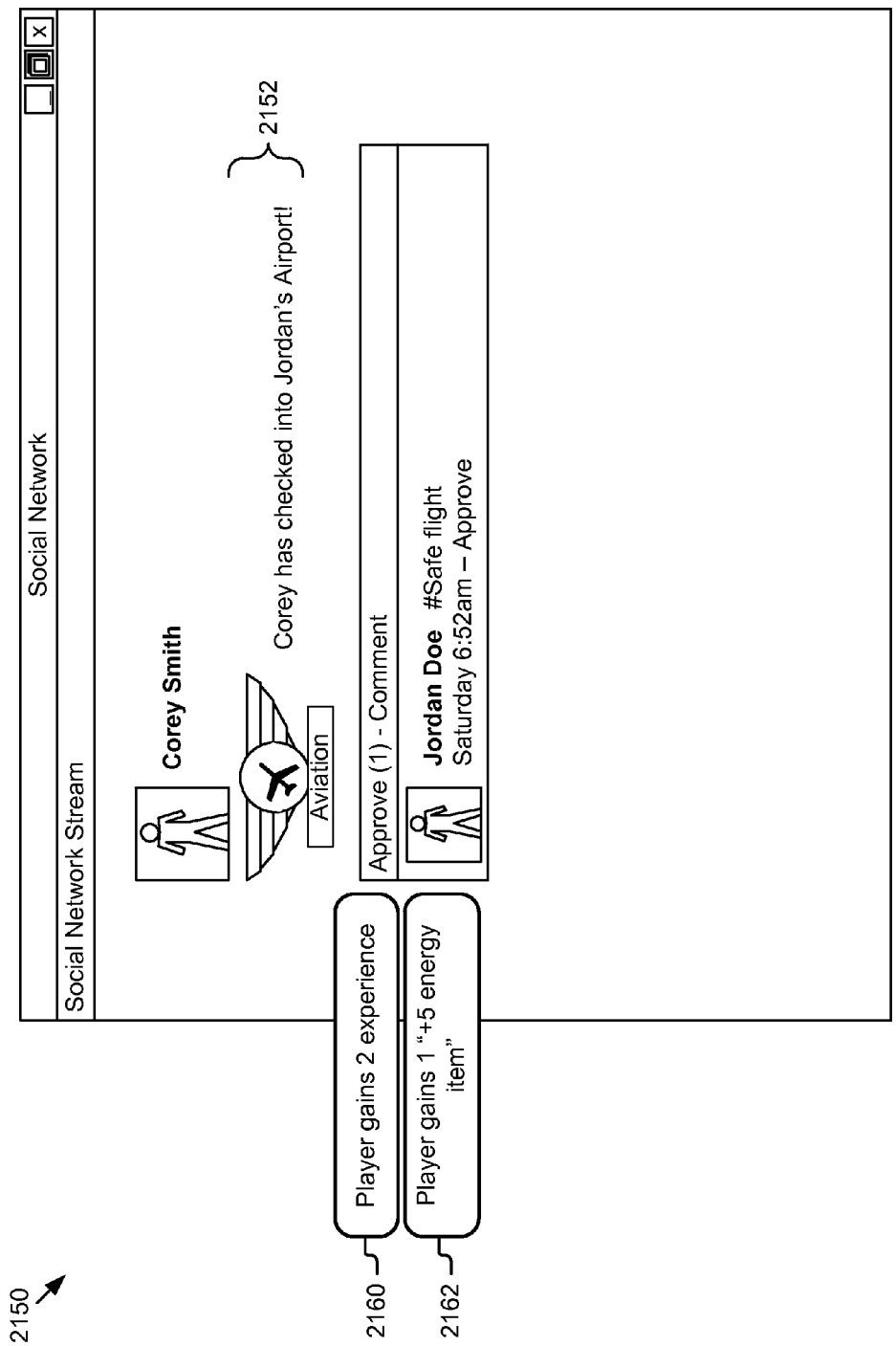
FIG. 21B is a graphical representation illustrating an example user interface for interacting with a game via a social network including non-players commenting on arriving at another player's virtual area within the game.

FIG. 21B illustrates an example of a user interface 2150 within a social network with a player notification about one player arriving at another player's area within the game and other non-player comments on the player notification. For example, the post 2152 indicates that the player has checked into a friend's airport. The notification 2160 indicates that for the approval, the player (i.e., poster) receives two experience points. The notification 2162 indicates that for the comment "#safe flight" from a non-player, the player (i.e., poster) receives one "+5 energy item."

Figure 22:
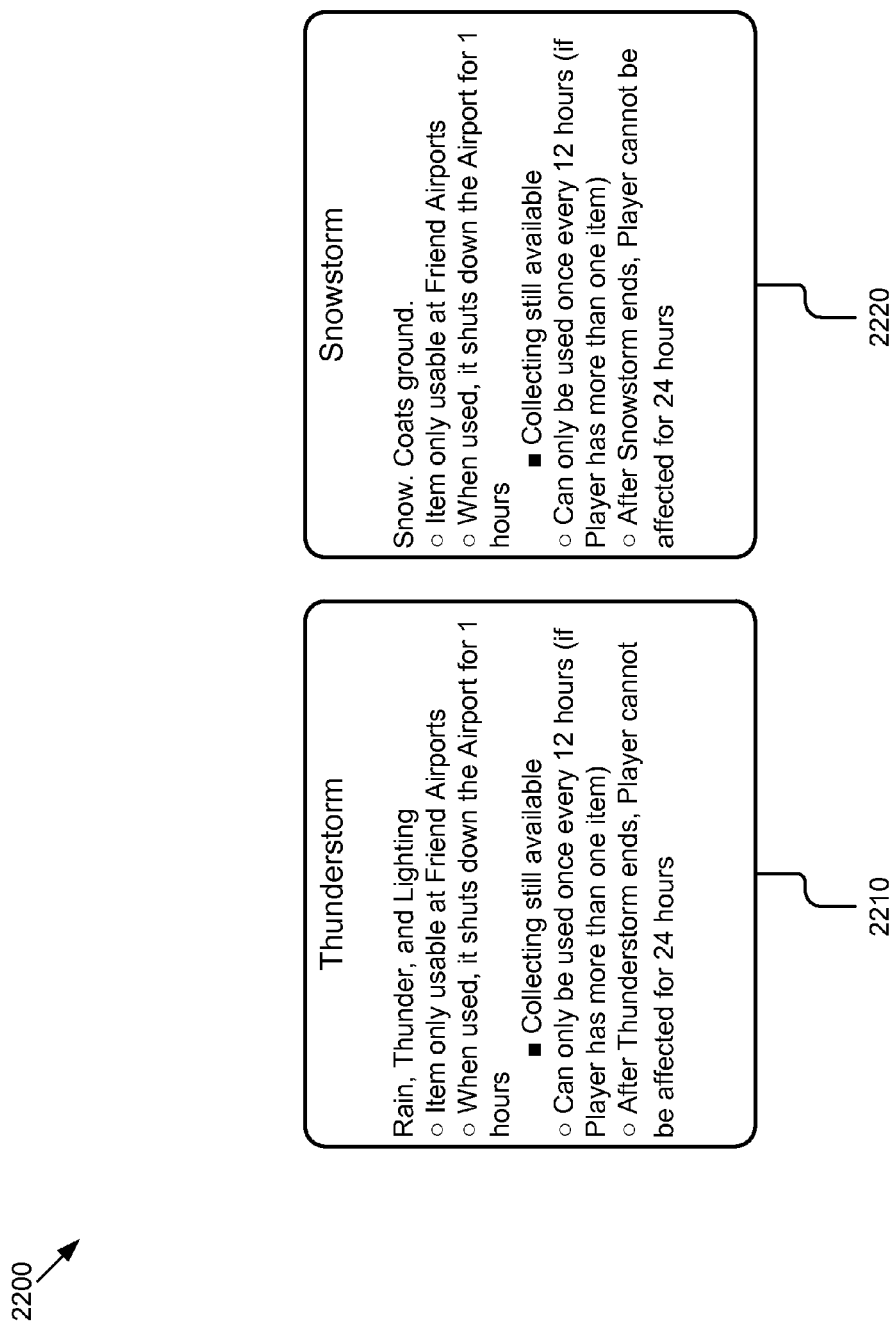
FIG. 22 is a graphical representation illustrating an example user interface with displays of weather items and their descriptions.

FIG. 22 illustrates an example of a user interface 2200 including two examples of game states that affect game play. The first example 2210 is a thunderstorm game item that may be used at friend's airports to add rain, thunder, lightning to the airport, and to shut down the airport for an hour. For example, this item can only be used once every 12 hours and after the thunderstorm ends the player cannot be affected for 24 hours. The second example 2220 is a snowstorm game item that may be used at friend's airports to add snow to the airport, and to shut down the airport for an hour. For example, this item can only be used once every 12 hours and after the thunderstorm ends the player cannot be affected for 24 hours.

Figure 23:
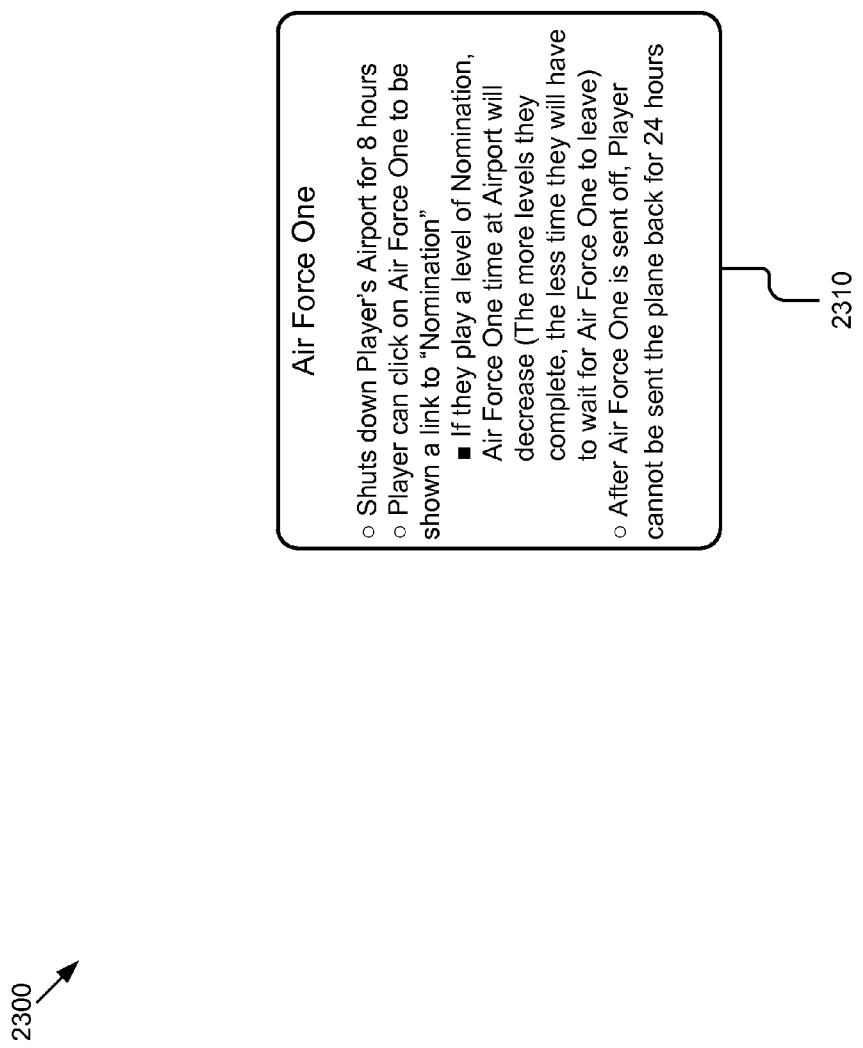
FIG. 23 is a graphical representation illustrating an example user interface configured to provide a game state that affects game play.

FIG. 23 illustrates an example of a user interface 2300 including one example of a game state that affects game play. The example 2310 is of Air Force One (i.e., the president) visiting the player's airport. For example, this shuts down the player's airport for 8 hours, the player can interact with Air Force One via a nomination link for decreasing the time Air Force One is at the airport, and after Air Force One is sent off, the player cannot be sent the airplane again for 24 hours.

The comments and game actions they invoke which are described in FIGS. 5-23 are used by way of example, one skilled in the art will recognize that other examples and configurations are possible.

The foregoing description of the implementations of the present technology has been presented for the purposes of illustration and description. It is not intended to be exhaustive or to limit the present technology to the precise form disclosed. Many modifications and variations are possible in light of the above teaching. It is intended that the scope of the present technology be limited not by this detailed description, but rather by the claims of this application. As should be understood by those familiar with the art, the present technology may be implemented in other specific forms, without departing from the spirit or essential characteristics thereof. Likewise, the particular naming and division of the modules, routines, features, attributes, methodologies, and other aspects are not mandatory or significant, and the mechanisms that implement the present disclosure or its features may have different names, divisions and/or formats. Furthermore, as should be apparent to one of ordinary skill in the relevant art, the modules, routines, features, attributes, methodologies and other aspects of the present technology can be implemented as software, hardware, firmware, or any combination of the three. Also, wherever a component, an example of which is a module, of the present technology is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present technology is in no way limited to implementation in any specific programming language, or for any specific operating system or environment. Accordingly, the disclosure of the present technology is intended to be illustrative, but not limiting, of the scope of the present disclosure, which is set forth in the following claims.

What is claimed is:

1. A computer-implemented method using one or more computing devices for implementing a video gaming application, comprising:

providing access by one or more user devices of one or more players to the video gaming application operated on at least one of a social network server, a third party server, and an application provided on electronic devices used by the one or more players;

providing an interface to the video gaming application via at least one of a social network interface, a mobile device interface, a gaming console interface, and a browser interface;

facilitating variable and distinct user experiences based on the one or more user devices that the one or more players use to access the video gaming application, the variable and distinct user experiences including at least one of a three-dimensional user interface and a two-dimensional user interface;

receiving, via the social network server, one or more social network interactions from one or more non-players, the one or more non-players being users with whom the one or more players share an affinity in a social network, the one or more social network interactions including a comment posted to the social network server by the one or more non-players, the comment being a comment on one or more events posted to the social network server; and modifying play of the video gaming application based on the one or more social network interactions from the one or more non-players.

2. The computer-implemented method of claim 1, further comprising:

posting the one or more events from the video gaming application to the social network server.

3. The method of claim 2, wherein the one or more social network interactions include an indication of approval by the one or more non-players of the one or more events posted to the social network server.

4. The method of claim 2, wherein posting one or more events to the social network server includes posting an indication of effects certain comments have on the play of the video gaming application.

5. The computer-implemented method of claim 1, further comprising:

modifying play of the video gaming application based on social network interactions from the one or more players.

6. The method of claim 1, further comprising receiving a selection from the one or more players indicating a different level of play, and wherein modifying play of the video gaming application includes modifying play of the video gaming application based on the selection.

7. A computer program product comprising a computer useable medium including a computer readable program, wherein the computer readable program when executed on a computer causes the computer to:

provide access by one or more user devices of one or more players to the video gaming application operated on at least one of a social network server, a third party server, and an application provided on electronic devices used by the one or more players;

provide an interface to the video gaming application via at least one of a social network interface, a mobile device interface, a gaming console interface, and a browser interface;

facilitate variable and distinct user experiences based on the one or more user devices that the one or more players use to access the video gaming application, the variable and distinct user experiences including at least one of a three-dimensional user interface and a two-dimensional user interface;

receive, via the social network server, one or more social network interactions from one or more non-players, the one or more non-players being users with whom the one or more players share an affinity in a social network, the one or more social network interactions including a comment posted to the social network server by the one or more non-players, the comment being a comment on one or more events posted to the social network server; and modify play of the video gaming application based on social network interactions from the one or more non-players.

8. The computer program product of claim 7, wherein the computer readable program when executed on a computer further causes the computer to:

post the one or more events from the video gaming application to the social network server.

9. The computer program product of claim 8, wherein posting one or more events to the social network server includes posting an indication of effects certain comments have on the play of the video gaming application.

10. The computer program product of claim 7, wherein the computer readable program when executed on a computer further causes the computer to:

modify play of the video gaming application based on social network interactions from the one or more players.

11. The computer program product of claim 7, further comprising receiving a selection from the one or more players indicating a different level of play, and wherein modifying play of the video gaming application includes modifying play of the video gaming application based on the selection.

12. A system comprising:

a processor, and;

a memory storing instructions that, when executed, cause the system to:

provide access by one or more user devices of one or more players to a video gaming application operated on at least one of a social network server, a third party server, and an application provided on electronic devices used by the one or more players;

provide an interface to the video gaming application via at least one of a social network interface, a mobile device interface, a gaming console interface, and a browser interface;

facilitate variable and distinct user experiences based on the one or more user devices that the one or more players use to access the video gaming application, the variable and distinct user experiences including at least one of a three-dimensional user interface and a two-dimensional user interface, wherein both the three-dimensional and two-dimensional user interface are configured to operate concurrently;

receive, via the social network server, one or more social network interactions from one or more non-players, the one or more non-players being users with whom the one or more players share an affinity in a social network, the one or more social network interactions including a comment posted to the social network server by the one or more non-players, the comment being a comment on one or more events posted to the social network server; and modify play of the video gaming application based on social network interactions from the one or more non-players.

13. A system as claimed in claim 12, wherein the video gaming application posts the one or more events to the social network server.

14. The system of claim 13, wherein the one or more social network interactions include a comment on the one or more events posted to the social network server.

15. The system of claim 13, wherein the one or more social network interactions include an indication of approval by the one or more non-players of the one or more events posted to the social network server.

16. The system of claim 13, wherein posting one or more events to the social network server includes posting an indication of effects certain comments have on the play of the video gaming application.

17. A system as claimed in claim 12, wherein the video gaming application modifies play based on social network interactions from the one or more players.

18. The system of claim 12, further comprising receiving a selection from the one or more players indicating a different level of play, and wherein modifying play of the video gaming application includes modifying play of the video gaming application based on the selection.

\* \* \* \* \*